US012736833B2

(12) United States Patent
Lau et al.

(10) Patent No.: US 12,736,833 B2
(45) Date of Patent: Sep. 15, 2026

(54) TRAINING GLASSES, TRAINING SYSTEM, AND TRAINING METHOD THEREFOR

(71) Applicants: Chun Ho Lau, Shanghai (CN); Chun Put Lau, Hong Kong (HK)

(72) Inventors: Chun Ho Lau, Shanghai (CN); Chun Put Lau, Hong Kong (HK)

( * ) Notice: Subject to any disclaimer, the term of this patent is extended or adjusted under 35 U.S.C. 154(b) by 327 days.

(21) Appl. No.: 18/563,754

(22) PCT Filed: Jun. 29, 2022

(86) PCT No.: PCT/CN2022/102449

§ 371 (c)(1),
(2) Date: Nov. 22, 2023

(87) PCT Pub. No.: WO2022/247959

PCT Pub. Date: Dec. 1, 2022

(65) Prior Publication Data

US 2024/0310658 A1 Sep. 19, 2024

(30) Foreign Application Priority Data

May 24, 2021 (CN) ........................ 202110567644.9

(51) Int. Cl.
*G02C 7/06* (2006.01)
*G02C 7/10* (2006.01)

(52) U.S. Cl.
CPC ............... *G02C 7/06* (2013.01); *G02C 7/104* (2013.01)

(58) Field of Classification Search
CPC . G02C 7/06; G02C 7/104; G02C 7/16; A61H 5/00; A61H 2205/024
USPC .................... 351/41, 159.01, 159.41, 159.48
See application file for complete search history.

(56) References Cited

U.S. PATENT DOCUMENTS

| | | | |
|---|---|---|---|
| 4,778,268 | A | 10/1988 | Randle |
| 7,862,171 | B2 | 1/2011 | Varnas et al. |

FOREIGN PATENT DOCUMENTS

| | | |
|---|---|---|
| CN | 101317120 | 12/2008 |
| CN | 201749260 | 2/2011 |
| CN | 201804169 | 4/2011 |
| CN | 104958169 | 10/2015 |
| CN | 204890521 | 12/2015 |
| CN | 212522367 | 2/2021 |
| CN | 215994744 | 3/2022 |

*Primary Examiner* — Tuyen Tra
(74) *Attorney, Agent, or Firm* — Bayramoglu Law Offices LLC

(57) ABSTRACT

Provided are training glasses, a training system, and a training method thereof. Each of the lenses includes a first refractive training area and a second refractive training area; the first refractive training area is an enclosed area at a center of each lens, and the second refractive training area is an area other than the first refractive training area of each lens, the second refractive training area has a diopter ranging from +1.0 D to +4.5 D. The training glasses and the training method of the present disclosure can provide a very uniform and stable peripheral diopter, and also avoid a significant change in diopters caused by a partition. Meanwhile, occurrence of a central diopter at the periphery is avoided, so as not to add adverse factors to the hyperopic defocus phenomenon of peripheral retinal, and the hyperopic defocus phenomenon of peripheral retinal can be effectively resisted.

17 Claims, 18 Drawing Sheets

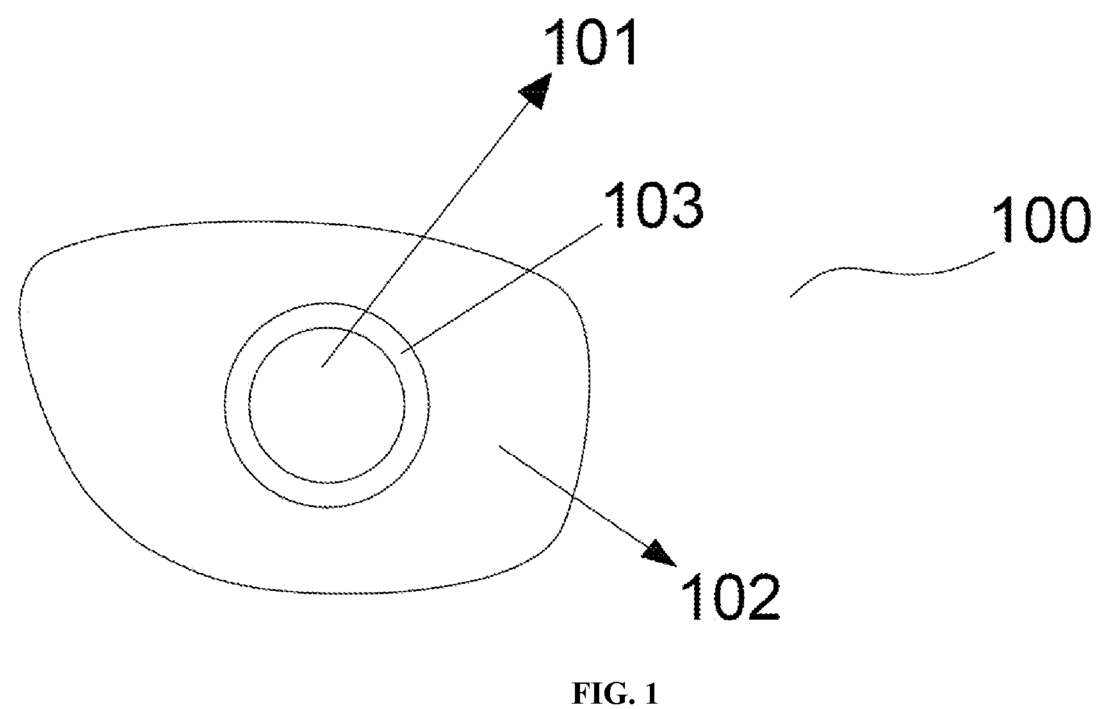
FIG. 1
FIG. 2A
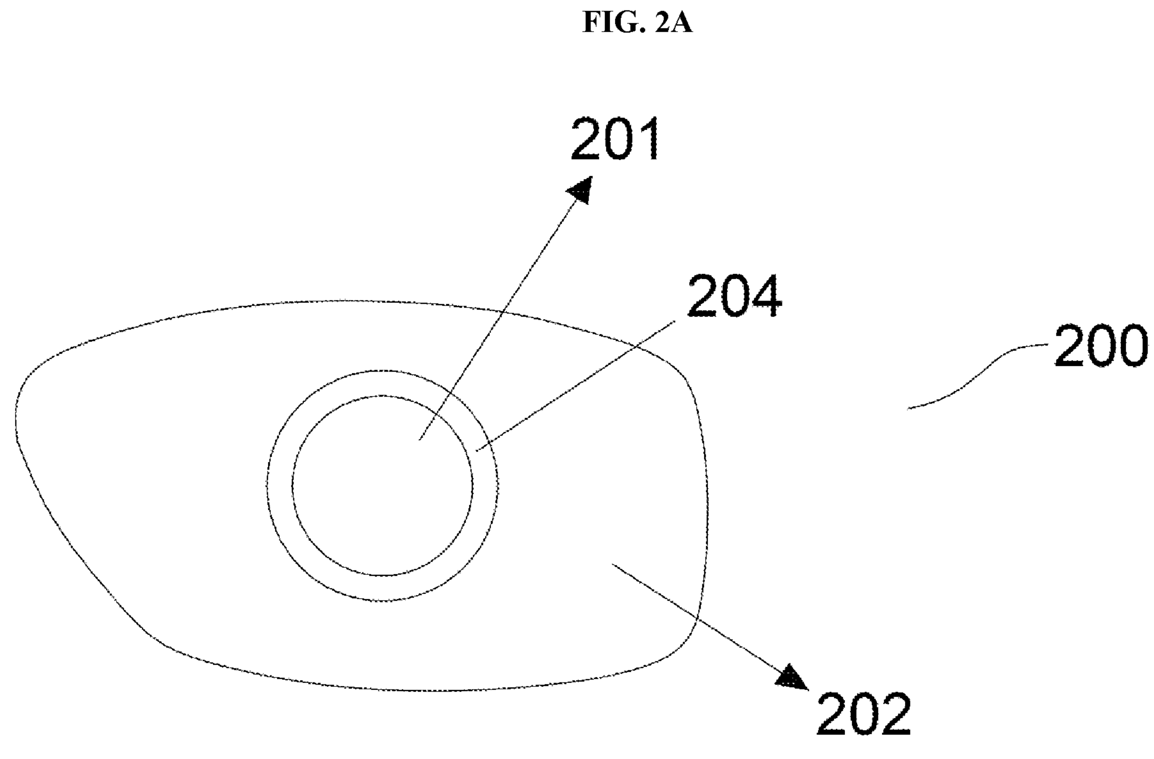

TRAINING GLASSES, TRAINING SYSTEM, AND TRAINING METHOD THEREFOR

CROSS-REFERENCE TO RELATED APPLICATION

This application is a national stage application of International Patent Application No. PCT/CN2022/102449, filed on Jun. 29, 2022, which claims priority of the Chinese Patent Application No. 202110567644.9, filed on May 24, 2021, both of which are incorporated by references in their entities.

TECHNICAL FIELD

The present disclosure relates to the field of eyesight correction training, and in particular, to training glasses, a training system, and a training method thereof.

BACKGROUND

When a person is looking at a visual target ahead, an image of a peripheral visual target will be simultaneously projected to the corresponding peripheral retina, an image of the visual target ahead and the image of the peripheral visual target are not focused on the retina simultaneously. For example, when a central training visual target is clearly focused on a center of the macular area, as the peripheral retina is relatively forward and closer to a crystalline lens, the image of the peripheral visual target is not focused on the peripheral retina, but behind the retina. In clinical practice, when the image of the peripheral visual target is focused behind the peripheral retina, it is referred to as "peripheral hyperopia defocus".

Damages of the "peripheral hyperopia defocus" to the eyesight are as follows:

When a myope looks at a distant visual target, in order to focus a distant central vision, the myope would wear a concave lens which corrects the myopic ametropia. The purpose is to obtain a clear central vision by moving, after the center and peripheral visual targets are refracted by the cornea and the crystalline lens, the central and adjacent visual targets' foci back to overlap with the macula region of the retina, while the distant peripheral vision will be moved more backwards, thus aggravating the peripheral hyperopia defocus.

More disadvantageously, when myope wearing the concave lenses correcting ametropia myopia reads and works at a close distance, at this time, the central and peripheral visual targets are closer to the eyes, the foci of the central and peripheral visual targets will move more backward and away from the retina, resulting in an artificial hyperopic ametropia and more severe peripheral hyperopia defocus.

At this time, the unfocused central and peripheral visual targets will stimulate the brain visual center. In order to get a relatively clearer visual image, the brain visual center has to activate the center of the near-reflex pathway in the midbrain, so that the ciliary muscle will contract (long-term contraction can cause ciliary muscle spasms), making the lens surface more convex and the anterior-posterior diameter larger (persistent in the presence of ciliary muscle spasms), resulting in increased accommodation (persistent in the presence of ciliary muscle spasms) to focus the visual image, and in general, only the central visual image is focused, as even stronger accommodation is needed to focus the peripheral visual target. On doing so, the focus of the central visual image will shift to the front of central retina, resulting in a new round of additional myopia ametropia. This is why wearing a concave lens to correct myopia ametropia can easily cause and aggravate the occurrence and progress of pseudomyopia and true myopia, leading to the rapid increase of the spherical dioptric power of myopia, which can increase easily by one to two diopters annually.

Mainstream brands of lenses currently produced and manufactured to manage the peripheral hyperopia defocus include ZEISS, Essilor, and HOYA.

For a traditional progressive lens, the dioptric power of a convex lens is only progressively added below the lens to resist presbyopia when the visual axis is moved downwards during reading and working at a close distance. Its purpose is not to resist the peripheral hyperopia defocus.

The "ZEISS MyoVision" lens is a 360° progressive lens towards the periphery. Progressiveness represents a continuous change in the diopter, so it does not exactly match the peripheral hyperopia defocus diopter of each individual area of the peripheral retina. When the central eye axis moves, such mismatch will get worse. In addition, due to the limitation of the manufacturing technology, there is a significant difference between the diopter of progressiveness in a vertical direction and that in a horizontal direction, resulting in additional image distortion. Therefore, it is not a good design to resist the peripheral hyperopia defocus.

The "Essilor Stellest" lens is designed in a form of peripheral concentric circle of convex lenses, in which an additional diopter gradually increases from inside to outside. There is a space between adjacent concentric circles, and the diopter of the space is the same as that of the central of the lens. This intermittent progressive design with continuous increase in the diopter generates increasingly larger fluctuation of diopter between concentric circle of convex lenses and intercircle space as well as interlenses space, and causes continuous distortion of images and is not a good design to resist the peripheral hyperopia defocus. When the central diopter of a myopia lens appears at the periphery thereof, the peripheral hyperopia defocus is aggravated, thus negating the purpose of resisting the peripheral hyperopia defocus.

The "HOYA MiyoSmart" lens is a lens designed in a form of peripherally hexagonal, with 396+3.5 D convex lenses. A separation diopter between the convex lenses is the diopter of the central lens. This intermittent non-progressive design with a significant change in the peripheral diopter between +3.5 D and the central diopter causes continuous deformation of images. In addition, compared to a 360° smooth and coherent peripheral visual field, the hexagonal boundary is not ideal and is not a good design to resist the peripheral hyperopia defocus. If the diopter of the central of a myopia lens appears at the periphery, the peripheral hyperopia defocus, will be aggravated, which is not conducive to resisting peripheral hyperopia defocus.

The above lenses do not solve the problem of myopia aggravation caused by hyperopic defocus of central vision at macula when a wearer is looking at things at a close distance.

SUMMARY OF THE INVENTION

For the above problems, the present disclosure provides special training glasses for offsetting a peripheral hyperopia defocus, and to cope with watching at a close distance or a far distance. The special training glasses are suitable for being used by trainees not wearing or having worn myopic glasses. The trainees with myopic glasses can be trained with the current myopic glasses.

The present disclosure discloses training glasses including two lenses, each of the lenses comprises a first refractive training area and a second refractive training area; the first refractive training area is formed as a enclosed area at a center of said each of the lenses, and the second refractive training area is formed as an area other than the first refractive training area of said each of the lenses, wherein the second refractive training area has an additional diopter ranging from +1.0 D to +4.5 D.

Preferably, the present disclosure further provides training glasses, each of the lenses further includes:

a transition area located between the first refractive training area and the second refractive training area; a width of the transition area is 0 to 10 mm, and a diopter of the transition area varies between a diopter of the first refractive training area and the diopter of the second refractive training area.

Preferably, the present disclosure further provides training glasses, the enclosed area is in a shape of any one of circle, ellipse, square, rectangle, and polygon.

Preferably, the present disclosure further provides training glasses, the first refractive training area comprises a convex lens with a central diopter of +1.50 D to +4.50 D.

Preferably, the present disclosure further provides training glasses, the first refractive training area comprises a plain glass area or a hollow area with zero diopter.

Preferably, the present disclosure further provides training glasses, each of the lenses further includes:

a third refractive training area, composed of a part of the second refractive training area above the first refractive training area, and the diopter of the first refractive training area is equal to a diopter of the third refractive training area.

Preferably, the present disclosure further provides training glasses, the second refractive training area is composed of a colored lens with darkness less than 50%.

The present disclosure further provides a training system, including the training glasses described above. The training system further includes:

a display unit; and a training device, including:

a training screen unit, comprising a screen isolation area vertically dividing the training screen unit into a first screen area and a second screen area;

a bracket and a base supporting the bracket; and a distance adjustment unit configured to adjust a width of the screen isolation area, wherein the screen isolation area is opaque charcoal, and the first screen area and the second screen area are transparent screens with different colors, wherein a distance between the training device and the display unit is not less than 45 cm.

Preferably, the present disclosure further provides a training system, the bracket further comprises an adjustable head support and an adjustable chin support.

Preferably, the present disclosure further provides a training system, the screen isolation area comprises a front plate unit and a rear plate unit which are stacked with each other; scales are arranged at an upper edge of each of the front plate unit and the rear plate unit; the rear plate unit adjusts the width of the screen isolation area by means of slide of the distance adjustment unit in a horizontal direction.

The present disclosure further provides a training method implemented by using the training system described above. The training method includes:

step I, obtaining a pupil distance of a trainee at a primary eye position, and adjusting a width of each of the screen isolation area and a display isolation area to be equal to the pupil distance;

step II, enabling a chin and a head of the trainee lean tightly against an adjustable chin support and an adjustable head support of the training device, respectively;

step III, arranging a first central training visual target and a second central training visual target on two sides outside the display isolation area, respectively;

step IV, providing at least two peripheral training visual targets on an area of the display unit where one of the first and second central training visual target is located;

step V, moving one of the peripheral training visual targets at 25° temporal to the trainee to an other of the peripheral training visual targets until the two peripheral training visual targets are overlapped, and then returning the one of peripheral training visual targets to a starting position thereof; and step VI, repeating step V at least twice, wherein the color of the first screen area is same as a color of the first central training visual target while and the color of the second screen area is same as a color of the second central training visual target on the display unit.

Preferably, the present disclosure further provides a training method, in step III, an initial distance between the first central training visual target and the second central training visual target is 2~30 mm greater than a pupil distance of the trainee when the trainee's eyes are at the primary eye position.

Preferably, the present disclosure further provides a training method, each of the first central training visual target and the second central training visual target has a length ranging from 5 to 60 mm, and a length-width ratio or a width-length ratio of 1:5.

Preferably, the present disclosure further provides a training method, each of the first central training visual target and the second central training visual target has a movement speed ranging from 0.1°/second to 3°/second.

Preferably, the present disclosure further provides a training method, each of the first central training visual target and the second central training visual target comprises any one of a three-dimensional (3D) visual target, a pattern visual target, a text visual target, a pattern and text combined visual target, and a pattern and color combined visual target.

Preferably, the present disclosure further provides a training method, a background color of each of the peripheral training visual targets is gray, and each of the peripheral training visual targets is a matte black pattern.

When the central eye axis moves, the new design of the present disclosure can also achieve maintaining pairing of hyperopic defocus for a considerable peripheral range, thus achieving a more stable effect of resisting the peripheral hyperopia defocus.

The lens is non-progressive and has no diopter partition, it can therefor provide a very uniform and stable peripheral diopter, and also avoid a significant change in diopters caused by a partition. Meanwhile, occurrence of a central diopter at the periphery is avoided, so it does not adversely increase the peripheral hyperopia defocus, and the peripheral hyperopia defocus can be effectively resisted.

It should be understood that the general descriptions above and the detailed descriptions below of the present disclosure are exemplary and illustrative and are intended to provide a further interpretation of the present disclosure as described in the claims.

BRIEF DESCRIPTION OF THE DRAWINGS

The embodiments of the present disclosure will now be described in detail with reference to the accompanying drawings. Examples are shown in the accompanying drawings with reference now to the preferred embodiments of the present disclosure in detail. In any possible cases, the same numerals will be used in all the accompanying drawings to represent the same or similar parts. In addition, although the terms used in the present disclosure are selected from the commonly known terms, some of the terms mentioned in the present disclosure may have been selected by the applicant according to his or her judgment, and their detailed meanings are explained in the relevant sections of the description herein. In addition, it is required to understand the present disclosure not only through actual terms used, but also through the meaning implied by each term.

Referring to the accompanying drawings below, the above and other objects, features, and advantages of the present disclosure will be apparent to those skilled in the art from the detailed description of the present disclosure.

FIG. 1 is a schematic structural diagram of a first training lens 100 used at a close distance according to the present disclosure;

FIG. 2A is a schematic structural diagram of a first embodiment of a second training lens 200 used at a far distance according to the present disclosure;

REFERENCE NUMERALS

Figure 2B:
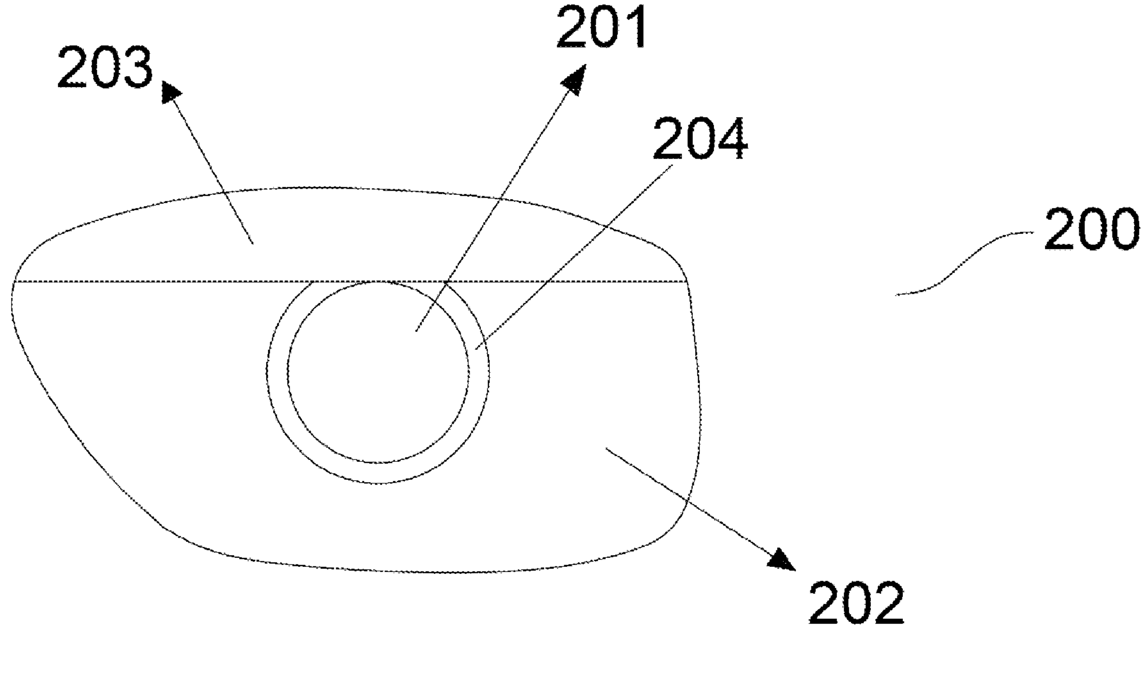
FIG. 2B is a schematic structural diagram of a second embodiment of the second training lens 200 used in a far distance according to the present disclosure.

100—first training lens;
101—first refractive training area of first training lens;
102—second refractive training area of first training lens;
103—transition area of first training lens;
200—second training lens;
201—first refractive training area of second training lens;
202—second refractive training area of second training lens;
203—third refractive training area of second training lens;
204—transition area of second training lens;
5—training glasses;
51—training glasses frame;
300—training device;
301—training screen unit;
302—adjustable head support;
303—adjustable chin support;
304—distance adjustment unit;
305—first screen area;
306—screen isolation area;
3061—front plate unit;
3062—rear plate unit;
307—second screen area;
308—antiskid base;
309—bracket;
400—display unit;
4011—first central training visual target;
4012—second central training visual target;
4021—first peripheral training visual target;
4022—second peripheral training visual target;
403—display isolation area;
4041—first central training visual target image;
4042—second central training visual target image; and
4043—fusion image of central targets.

DETAILED DESCRIPTION OF THE EMBODIMENTS

In order to explain the technical solution of the embodiment of the present disclosure more clearly, the drawings needed in the description of the embodiment will be briefly introduced hereinafter. Obviously, the accompanying drawings in the following description are only some examples or embodiments of the present disclosure. For those of ordinary skill in the art, the present disclosure can be applied to other similar situations according to these drawings without creative labor. Unless it is obvious from the linguistic context or otherwise stated, the same reference numerals in the drawings represent the same structure or operation.

As shown in the present disclosure and claims, unless exceptions are clearly indicated in the context, the words "a", "an", "a type of" and/or "the" do not refer to the singular, but may also refer to the plural. Generally speaking, the terms "including" and "comprising" only imply the inclusion of clearly identified steps and elements, and these steps and elements do not constitute an exclusive list. A method or device may also contain other steps or elements.

Unless otherwise specified, the relative arrangement of parts and steps, numerical expressions and numerical values set forth in these embodiments do not limit the scope of the present disclosure. At the same time, it should be understood that for the convenience of description, the dimensions of various parts shown in the drawings are not drawn according to the actual scale relationship. Techniques, methods and devices known to those of ordinary skill in the art may not be discussed in detail, but in appropriate cases, the techniques, methods and devices should be regarded as part of the authorization specification. In all examples shown and discussed herein, any specific values should be interpreted as illustrative only and not as a limitation. Therefore, other examples of exemplary embodiments may have different values. It should be noted that similar numbers and letters indicate similar items in the following drawings. Therefore, once an item is defined in one drawing, it does not need to be further discussed in subsequent drawings.

In the description of the present disclosure, it should be understood that the orientational or positional relationships indicated by the orientation words such as "front, back, upper, lower, left, right", "lateral, vertical, perpendicular, horizontal" and "top, bottom" are usually based on the orientation or positional relationship shown in the accompanying drawings only for the convenience of describing the present disclosure and simplifying the description. Unless otherwise stated, these orientation words do not indicate or imply that the referred devices or elements must have a specific orientation, be constructed and operated in a specific orientation, and therefore should not be construed as limiting the scope of the present disclosure. The orientation words such as "inside, outside" refer to the inside and outside with respect to the outline of each component itself.

For the convenience of description, spatially relative terms such as "on", "over", "on the upper surface of" and "above" can be used here to describe the spatial positional relationship between a device or feature and other devices or features as shown in the drawings. It should be understood that spatially relative terms are intended to encompass different orientations in use or operation in addition to the orientation of the device depicted in the drawings. For example, if the devices in the drawings are inverted, devices described as "over other devices or structures" or "on other devices or structures" will be positioned as "under other devices or structures" or "below other devices or structures". Thus, the exemplary term "over" can include both directions of "over" and "below". The device can also be positioned in other different positions (rotated by 90 degrees or in other orientations), and the spatial relative description used here is explained accordingly.

In addition, it should be noted that the words "first" and "second" are used to define parts only for the convenience of distinguishing the corresponding parts. Unless otherwise stated, the above words have no special meaning, so that they cannot be understood as limiting the scope of the present disclosure. In addition, although the terms used in the present disclosure are selected from well-known and common terms, some terms mentioned in the specification of the present disclosure may be selected by the applicant according to the applicant's judgment, and their detailed meanings are explained in the relevant parts of the description herein. In addition, it is required to understand the present disclosure not only by the actual terms used, but also by the meaning contained in each term.

Flowcharts are used in the present disclosure to explain the operations performed by the system according to the embodiment of the present disclosure. It should be understood that the preceding or following operations are not necessarily performed accurately in order. Instead, the various steps can be processed in reverse order or simultaneously. At the same time, other operations can be added to these procedures, or one or more operations can be removed from these procedures.

There are different medical definitions for the macular area. A commonly used clinical definition is used in the present disclosure. The macular area is located in a central of the retina, and occupies a range from the center 0° to 25° of the central visual field (generally, there are no cone-shaped photoreceptor cells in retina greater than 25° From the center), and the peripheral retina and a relative visual field are located at retina greater than 25° From the center. As the peripheral retina does not have cone-shaped photoreceptor cells, and the rod photoreceptor cells' density decreases significantly from 20° towards the retina periphery, making the peripheral retina unable to contribute to a stereoscopic vision. The important function of the peripheral vision is to recognize common structures and forms, distinguish similar forms and actions, and form a sense of a visual background. The sense of the central vision and the contribution of the peripheral vision constitute a detailed panoramic visual field seen with the eyes daily.

Due to the spherical shapes of the eyes, sizes of the pupils in daily life and a relative position of the crystalline lens and the peripheral retina, the main peripheral retina that has an important contribution to the overall vision in clinical practice refers to a range (approximately 25° to 60°) in the front of and behind relative to the equator (approximately at 43°). Since the peripheral hyperopia defocus can cause and aggravate the formation and progress of myopia, weakening or offsetting the peripheral hyperopia defocus can help inhibit the occurrence of pseudomyopia and true myopia.

Based on the above facts and reasoning, the applicant has designed two kinds of training lenses used at a close distance and a far distance respectively. Specific introductions are as follows.

FIG. 1 is a schematic structural diagram of a first training lens 100 used in a close distance according to the present disclosure.

The first training lens 100 is a 360° bifocal lens suitable for reading and working at the close distance, which can be used in reading such as computers and books, and eyesight training.

A lens area of the first training lens 100 is divided into a first refractive training area 101 and a second refractive training area 102. The first refractive training area 101 is formed as a enclosed area in a center of the lens, and the second refractive training area 102 is formed as an area in the lens other than the first refractive training area 101. Since the first refractive training area 101 is the enclosed area, the first training lens 100 is also referred to as a special 360° bifocal lens. In addition, a width of the first training lens 100 from left to right is approximately 25 to 60 mm (not limited to this range), and a height of the first training lens 100 from top to bottom is approximately 25 to 40 mm (not limited to this range).

Considering improvement of the visual comfort during movement of the visual axis from an central area outwards towards relatively more peripheral area, in the structure shown in FIG. 1 a transition area 103 is added between the first refractive training area 101 and the second refractive training area 102 for buffering a difference between a diopter of the first refractive training area 101 and that of the second refractive training area 102. A width of the transition area 103 is in a range of 0 to 10 mm, and a minimum diopter of the transition area is greater than or equal to the diopter of the first refractive training area 101, while a maximum diopter of the transition area is less than or equal to the diopter of the second refractive training area 102.

In a preferred embodiment shown in FIG. 1, the first refractive training area 101 is a circular enclosed area with a diameter of 13 mm (not limited to this, ranging from 5 mm to 20 mm), and a convex lens having a central diopter of +1.50 D with a range of +0.75 D to +3.00 D. The first refractive training area 101 is a colorless lens, and the second refractive training area 102 is another lens area other than the first refractive training area 101, which is purple with 25% darkness (not limited to this, ranging from 10% to 50%).

In a preferred embodiment, the reason and advantage of using the purple color at the second refractive training area 102 are as follows: the purple color is not dazzling, has the shortest wavelength among visible light, increases the diopter by approximately +0.15 D compared to red light, has a peripheral diopter of +3.50 D (ranging from +1.5 D to +4.50 D), and includes a base-in prism.

An ideal distance between eyes and the visual target when watching at close distance, range should be maintained at no less than 35 cm. Myopia may form easily if the distance between eyes and the visual target is too short. The accommodation ability and the speed of accommodation vary with each individual that some people need help. In clinical practice, the diopter of +1.5 D can usually meet such need in most people, and this helps a person reading at a close distance to avoid excessive accommodation and the occurrence or aggravation of myopia, and avoid the need of lowering reader's head close to the book or having the book at shorter reading distance. Therefore, an initial diopter of the first refractive training area 101 is usually designed to be +1.5 D.

In order to offset the peripheral hyperopia defocus, the diopter of the second refractive training area 102 is equal to the diopter of +1.5 D plus an additional diopter of +2.0 D, thus the diopter of the second refractive training area 102 ranges around +3.5 D. This is a comfortable initial diopter to most patients. Depending on the degree of adaptation and responses after training, the diopter of the second refractive training area 102 can be increased or decreased to a diopter ranging between +1.5 D and +4.5 D.

When working at a close distance, for trainees who are or not wearing myopic glasses, the first training lens 100 with the above structure is used. The trainees who are not wearing myopic glasses can directly wear the first training lens 100, while the trainees who are wearing myopic glasses can directly wear the first training lens 100 on top of the current myopic glasses (in this case, there are two sets of lenses) or the myopic diopter and astigmatism diopter of the current myopic glasses are added to the first refractive training area of the first training lens 100 (in this case, there is one set of lenses).

For example: If a trainee has a myopic diopter of −3.0 D, there are two ways for the trainee to use the first training lens 100:

Way I:

The trainee can directly wear the first training lens 100 with the first refractive training area 101 which is a convex lens with a diopter of +1.5 D (ranging from +0.75 D to +3.00 D).

Way II:

The diopter of the first refractive training area 101 of the first training lens 100 is designed to be −3.0 D+(+1.5 D)=(−1.5 D), so the trainee only needs to wear one set of lenses. Both ways can achieve the expected purpose and effect.

The adoption of the first training lens 100 with the above structure negates the hyperopic defocus caused by backward movement of foci of the central and peripheral visual images when the central and peripheral visual targets are closer to the eyes. Therefore avoiding the activation of the near-reflex pathway center, contraction of the ciliary muscles, an increase of the anterior-posterior diameter of the crystalline lens, and increased accommodation.

FIGS. 2A-2B are schematic structural diagrams of second training lenses 200 used at a far distance viewing in the present disclosure.

The second training lens 200 used at a far distance is suitable for far distance viewing, such as watching a blackboard, movies, distant visual targets, walking, and daily activities indoors and outdoors.

The second training lens 200 has three kinds of designs, which are explained below respectively:

As shown in FIG. 2A, the second training lens 200 is also divided into a first refractive training area 201, a second refractive training area 202, and a transition area 204 between the first refractive training area 201 and the second refractive training area 202.

The first refractive training area 201 is a circular plain glass or hollow area with a diameter of 15 mm (not limited to this, ranging from 5 mm to 20 mm) with a central diopter of 0. The second refractive training area 202 is a lens with a certain diopter which is adjusted to fit the trainee comfortness to resist the hyperopic defocus of about +0.5 D just anterior to the edge of the macula, and about +4.5 D at 45° peripheral retinal. Therefore, an average diopter of +2.50 D is adopted as an initial diopter for the second refractive training area 202, ranging from +1.00 D to +4.00 D. For myopia and astigmatism glasses wearers, the peripheral diopter is +2.50 D, ranging from +2.00 D to +3.00 D. A width of the lens 200 from left to right is approximately 25 to 60 mm (not limited to this range), and a height of the lens from top to bottom is approximately 25 to 40 mm (not limited to this range). The transition area 204 satisfies a width of 0 to 10 mm, and a minimum diopter of the transition area is greater than or equal to the diopter of the first refractive training area 201 while and a maximum diopter of the transition area is less than or equal to the diopter of the second refractive training area 202.

Way I:

Trainees not wearing myopic glasses can directly wear the second training lens 200 with a central diopter of 0, and a diopter of the second refractive training area 202 is +2.50 D, ranges from +1.00 D to +4.00 D.

Way II:

The trainees wearing myopic glasses can directly wear the current myopic lenses (in this case, there are two sets of lenses) or the myopic diopter and astigmatism diopter of the current myopic lenses are added to the first refractive training area of the second training lenses 200 (in this case, there is one set of lenses).

For example, if a trainee has a myopia diopter of −3.0 D, the second training lens 200 is made to be as follows: the diopter of the first refractive training area 201 is −3.0 D; the diopter of the second refractive training area 202 is −3.0 D+(+2.50 D), that is −0.5 D; and the additional peripheral diopter ranges from +1.00 D to +4.00 D. In this case the trainee only needs to wear one set of lenses.

Way III:

In addition to the example shown in FIG. 2A described above, the structure of FIG. 2B can also be adopted:

The second training lens 200 is also divided into a first refractive training area 201, a second refractive training area 202, a third refractive training area 203, and a transition area 204 between the first refractive training area 201 and the second refractive training area 202.

The third refractive training area 203 is a portion delineated from the second refractive training area 202 and located above the first refractive training area 201.

The first refractive training area 201 is a circular plain glass or hollow area with a diameter of 15 mm (not limited to this, ranging from 5 mm to 20 mm) with a central diopter of 0. A diopter of the third refractive training area 203 is the same as that of the first refractive training area 201. The second refractive training area 202 is a lens for the peripheral with a +2.50 D diopter, ranging from +1.00 D to +4.00

D. For myopia and astigmatism glasses wearers, the peripheral diopter is +2.50 D, ranging from +2.00 D to +3.00 D. A width of the first training lens 200 from left to right is approximately 25 to 60 mm (not limited to this range), and a height of the first training lens 100 from top to bottom is approximately 25 to 40 mm (not limited to this range). The transition area 204 has a width of 0 to 10 mm, and a minimum diopter of the transition area is greater than or equal to the diopter of the first refractive training area 201, while a maximum diopter of the transition area is less than or equal to the diopter of the second refractive training area 202.

For example, if a trainee has a myopic diopter of −3.0 D, there are two ways for the trainee to use the second training lens 200 shown in FIG. 2B:

Way I: The trainee directly wears the second training lens 200 on top of the current myopic lens.

Way II: The second training lens 200 is made to be as follows: the diopters of both the first refractive training area and the third refractive training area are −3.0 D; the peripheral diopter is −3.0 D+(+2.50 D), that is −0.5 D, and the additional peripheral diopter ranging from +1.00 D to +4.00 D. The trainee only needs to wear one set of lenses. Both ways can achieve the expected purpose and effect. The second refractive training area 202 other than the first refractive training area 201 and the third refractive training area 203 of the second training lens 200 is purple with 25% darkness (not limited to this, ranging from 10% to 50%). The reason and advantage of using the purple color at second refractive training area are as follows: the purple color second refractive training area is not dazzling, has the shortest wavelength among visible light, and increases the diopter by approximately +0.15 D compared to red light. In this way, the second refractive training area 202 helps to resist the peripheral hyperopia defocus when viewing at far distance targets.

A person wearing the second training lens 200 is free to watch central visual targets at the far distance, such as TV, and the wearers can move freely as well.

It should be noted that the first refractive training areas 101 and 201 of the above embodiments are all circular, alternatively, they can be replaced with other enclosed shapes such as ellipse, square, rectangle, and polygon.

Figure 3:
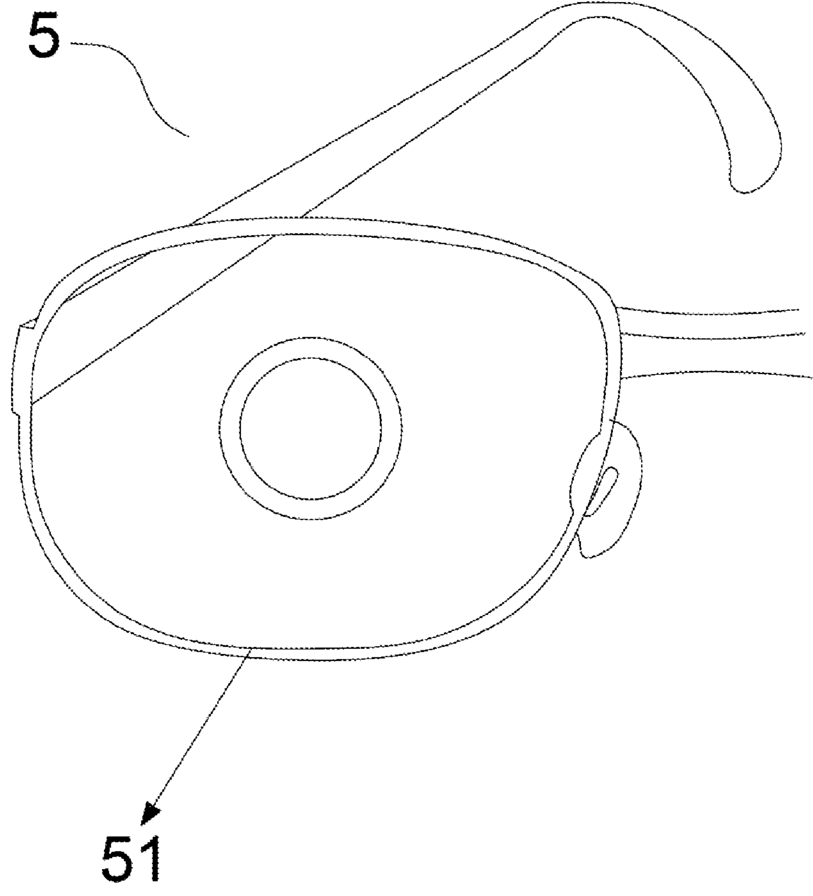
FIG. 3 is a schematic structural diagram of training glasses formed by applying the first training lens or the second training lens to a glasses frame.

FIG. 3 is a schematic structural diagram of applying the aforementioned first training lens or second training lens to a glasses frame 51 to form a pair of training glasses 5.

It should be noted that for trainees who do not wear glasses, the glasses frame 51 has a normal size and shape, and the trainees can directly wear the glasses during training. For trainees who are wearing myopic glasses or myopic and astigmatism corrective glasses, the glasses frame 51 has a slightly large size and sleeves the myopic glasses frame of the trainees when used.

This set of special lens is used by the trainees who wear or do not wear myopic glasses to offset the peripheral hyperopia defocus, when watching at near or far distance objects, so as to resist the peripheral hyperopia defocus continuously, thus inhibiting the occurrence and progress of pseudomyopia and true myopia.

To enhance the training effect, the present disclosure further provides a training device in conjunction with the aforementioned training glasses, as specifically described below.

Figure 4A:
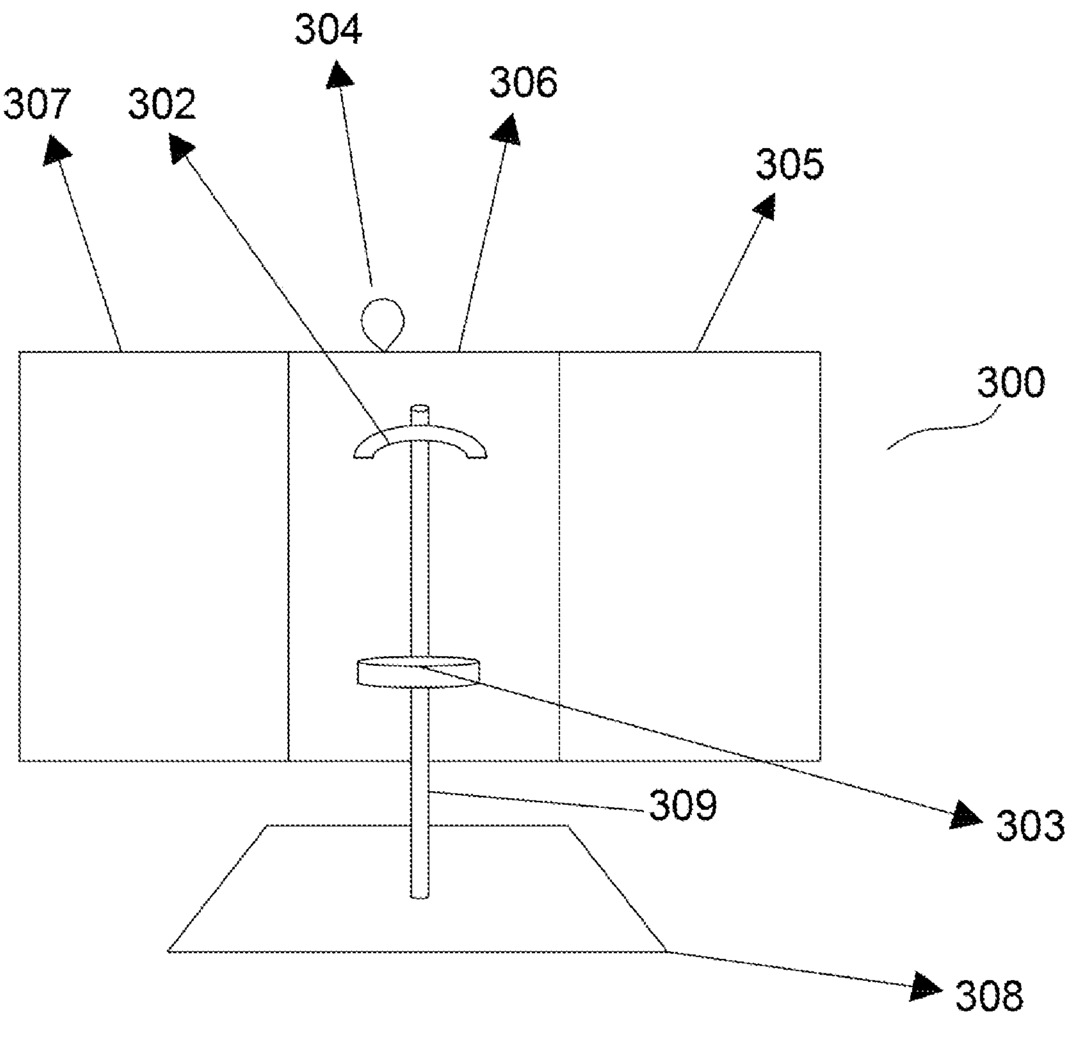
FIG. 4A and FIG. 4B illustrate a front view and a side view of a training device according to the present disclosure, respectively.
Figure 4B:
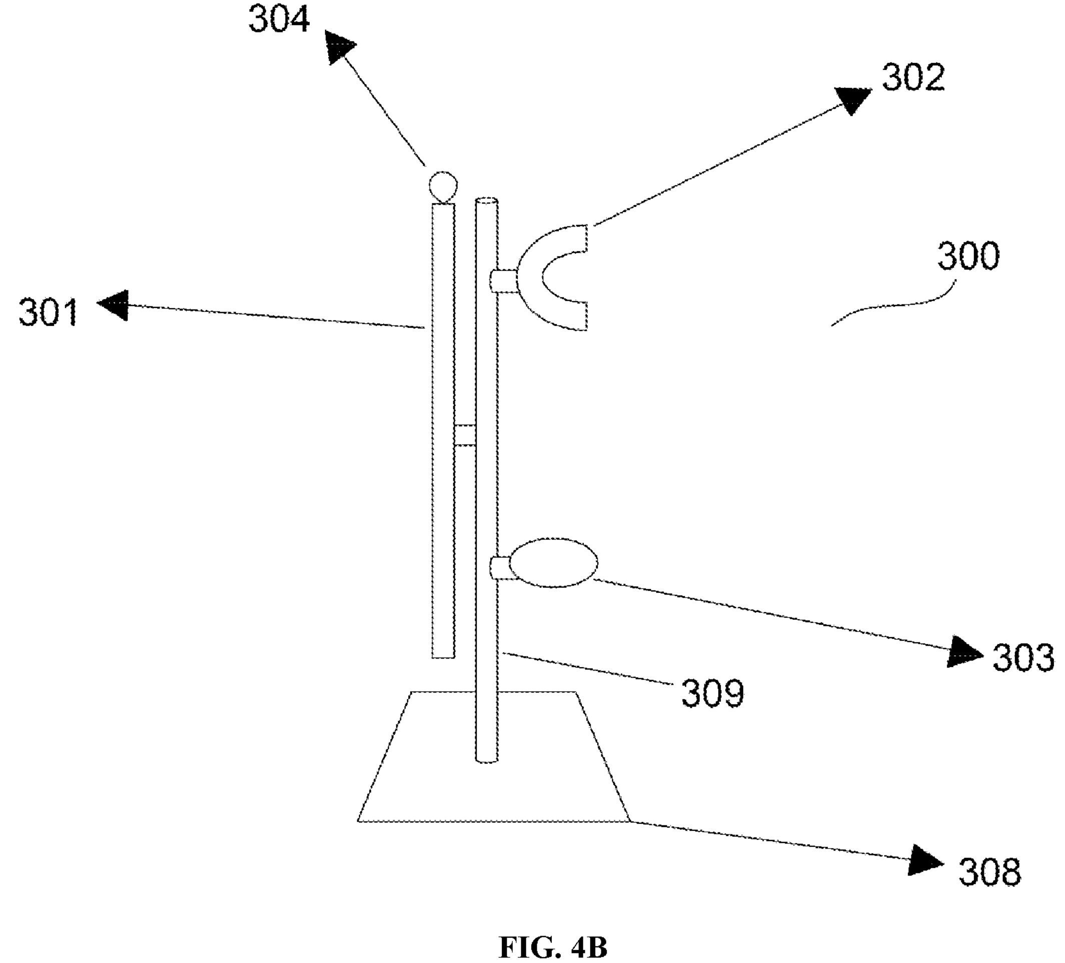

FIG. 4A and FIG. 4B illustrate a front view and a side view of a training device 300 according to the present disclosure, respectively. The device is described in detail in combination with FIG. 4A and FIG. 4B.

The training device includes a base 308, a bracket 309, and a vertical training screen unit 301. The base 308 is usually of an antiskid structure to support the bracket 309 and the training screen unit 301.

The training screen unit 301 is a rectangular plate and is longitudinally divided into three areas, namely, a first screen area 305, a screen isolation area 306, and a second screen area 307 in sequence.

The bracket 309 is perpendicular to the base 308 and is located directly in front of a center of the training screen unit 301. In order to adapt to differences in heights and facial shapes of trainees, an adjustable head support 302 and adjustable chin support 303 are also mounted on the bracket 309.

In addition, the training device further includes a distance adjustment unit 304, configured to adjust a width of the screen isolation area 306, or adjust a horizontal spacing between the first screen area 305 and the second screen area 307. For ease of operation, the distance adjustment unit is usually arranged above the training screen unit 301.

The training screen unit 301 described above is made of a lightweight and sturdy material. The screen isolation area 306 is opaque charcoal. The first screen area 305 on the right side is transparent red (but not limited to red), and the second screen area 307 on the left side is transparent green (not limited to green). In this way, the opaque charcoal screen isolation area 306 divides the training screen unit into a left visual field and a right visual field, which avoids the occurrence of the binocular convergence that will activate the near-reflex pathway.

In a preferred embodiment, the transparent red first screen area 305 has a width of 7 to 15 cm, a height of 25 to 30 cm, and a thickness of 0.2 to 0.5 cm.

The transparent green second screen area 307 has a width of 7 to 15 cm, a height of 25 to 30 cm, and a thickness of 0.2 to 0.5 cm.

The opaque charcoal screen isolation area 306 has a height of 25 to 30 cm and a thickness of 0.2 to 0.5 cm. A width of the screen isolation area is adjusted to be consistent with a pupil distance of trainee when the trainee's eyes are at the primary eye position.

Figure 5A:
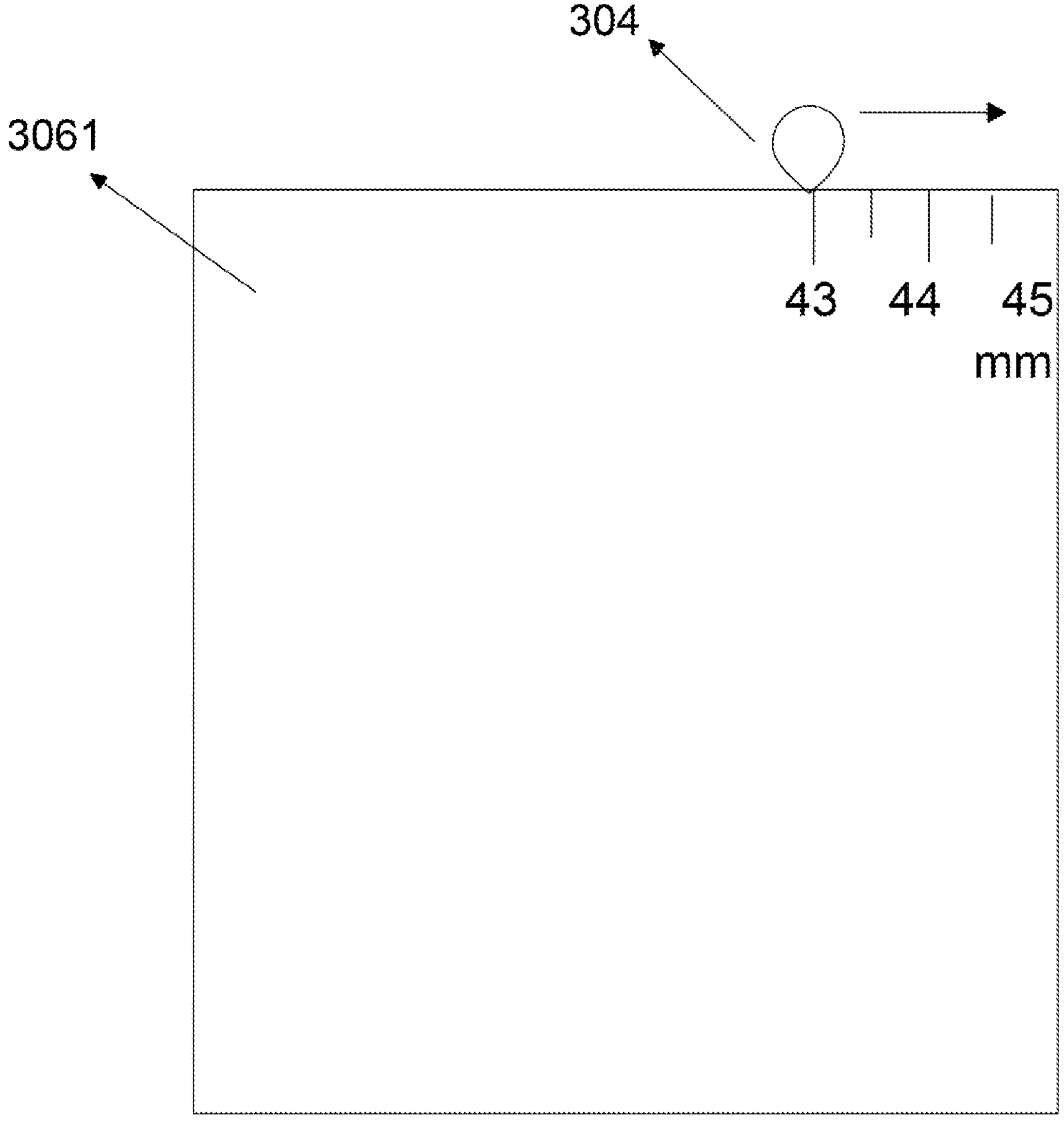
FIG. 5A and FIG. 5B illustrate schematic diagrams of use states of a distance adjustment unit of the training device according to the present disclosure.
Figure 5B:
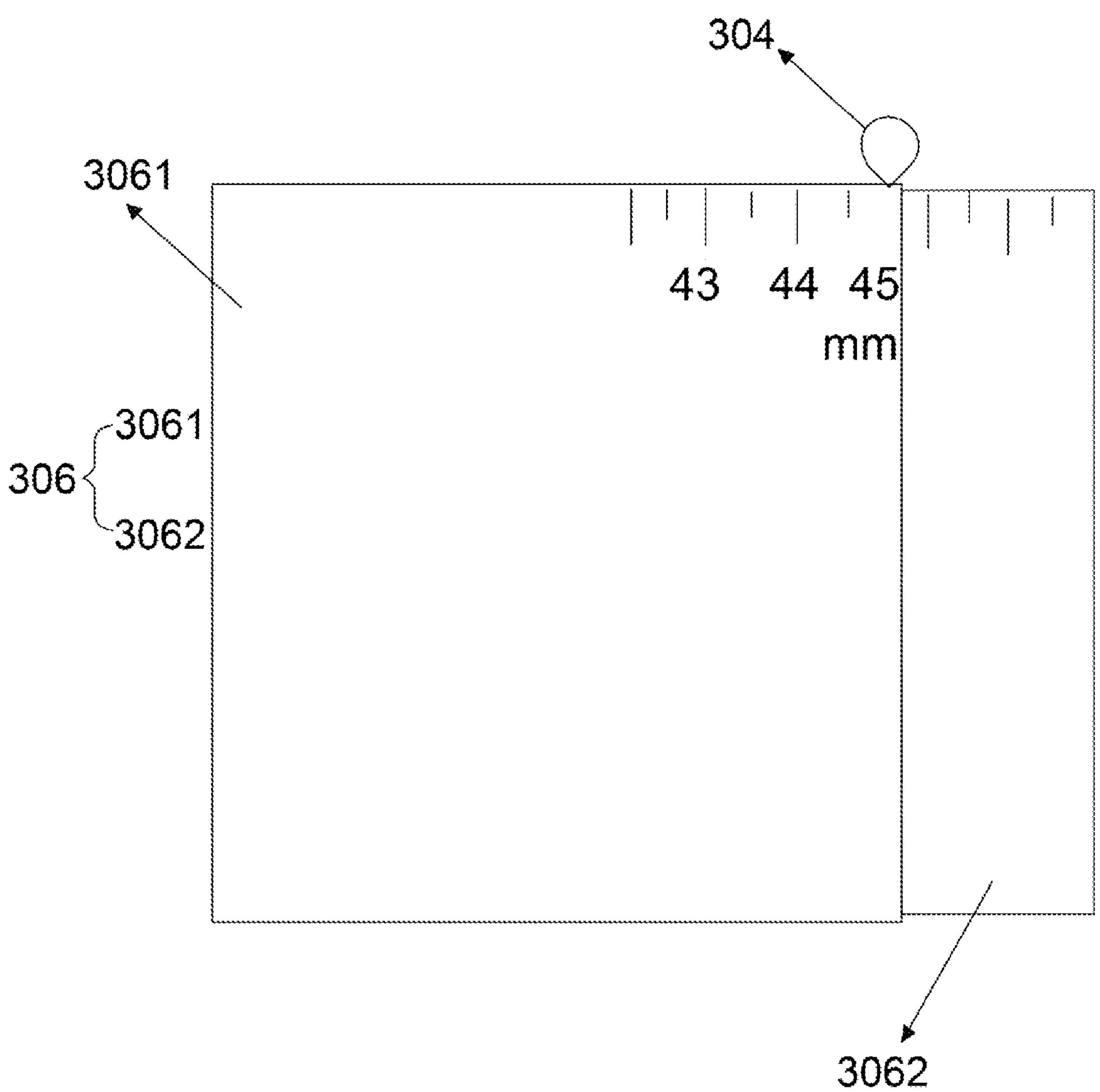

FIG. 5A and FIG. 5B further illustrate schematic diagrams of an embodiment of adjusting the screen isolation area 306 by the distance adjustment unit 304.

The screen isolation area 306 is composed of a front plate unit 3061 and a rear plate unit 3062 stacked, and scales are arranged at the upper edge of each of the front plate unit and the rear plate unit. A maximum length of the front plate unit 3061 is 45 mm, and a maximum length of the rear plate unit 3062 stacked therebehind is 25 mm. The rear plate unit 3062 can be pulled out in an arrow direction with the distance adjustment unit 304, thus gradually increasing the width of the screen isolation area 306 from 45 mm of the front plate unit 3061 to its maximum width. Therefore, the width of the screen isolation area 306 can be adjusted by pulling the distance adjustment unit 304.

A variation range of the width the screen isolation area can be from the initial position of 45 mm as shown in FIG. 5A to the maximum width of 70 mm where the rear plate unit 3062 is fully pulled out. This design aims to adjust the width of the screen isolation area 306 according to the pupil distance of a trainee when the trainee's eyes are at the primary eye position during use of the training device.

Figure 6:
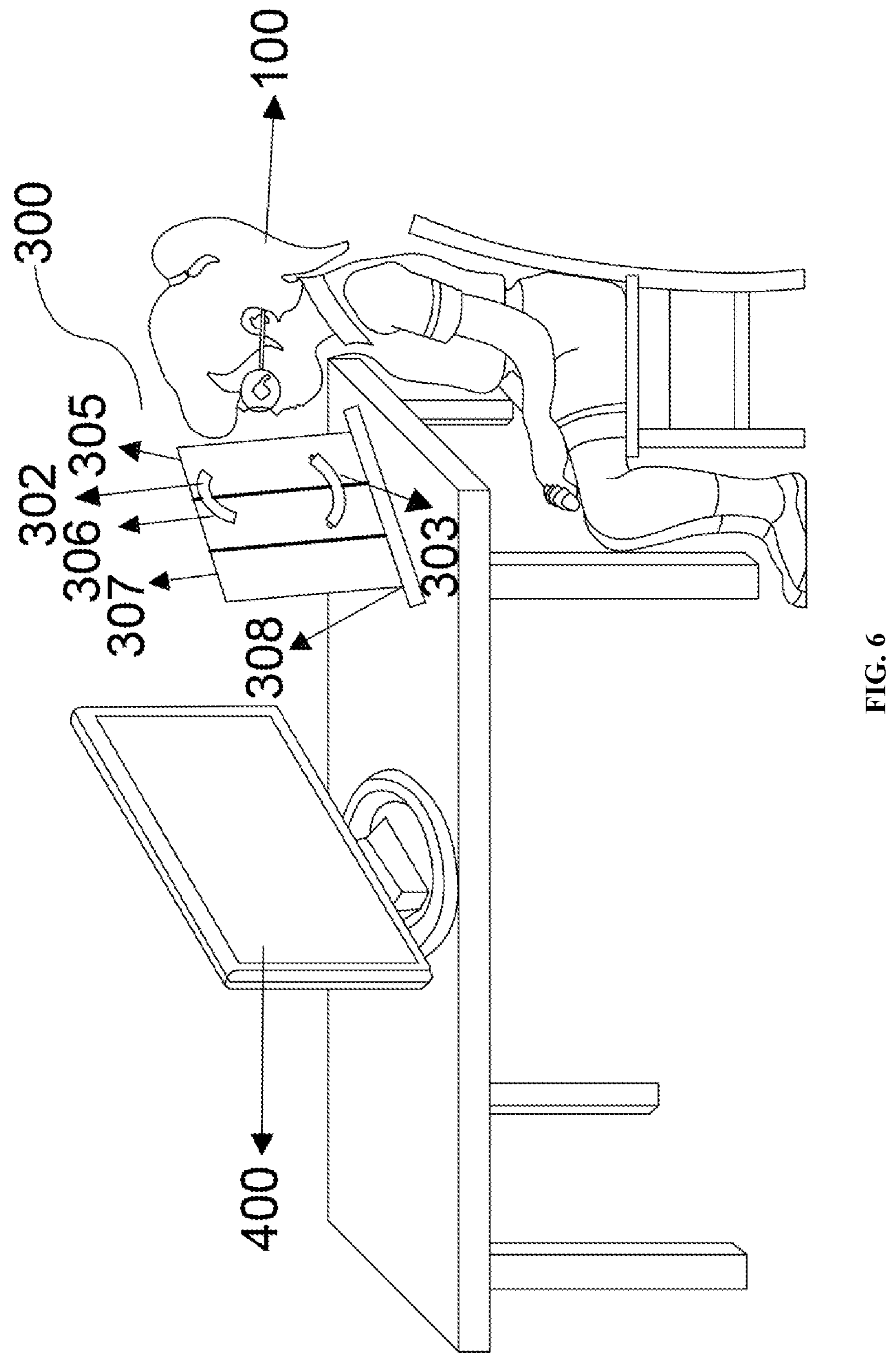
FIG. 6 illustrates a schematic diagram of a use state of an embodiment of the training glasses and the training device according to the present disclosure.
Figure 7:
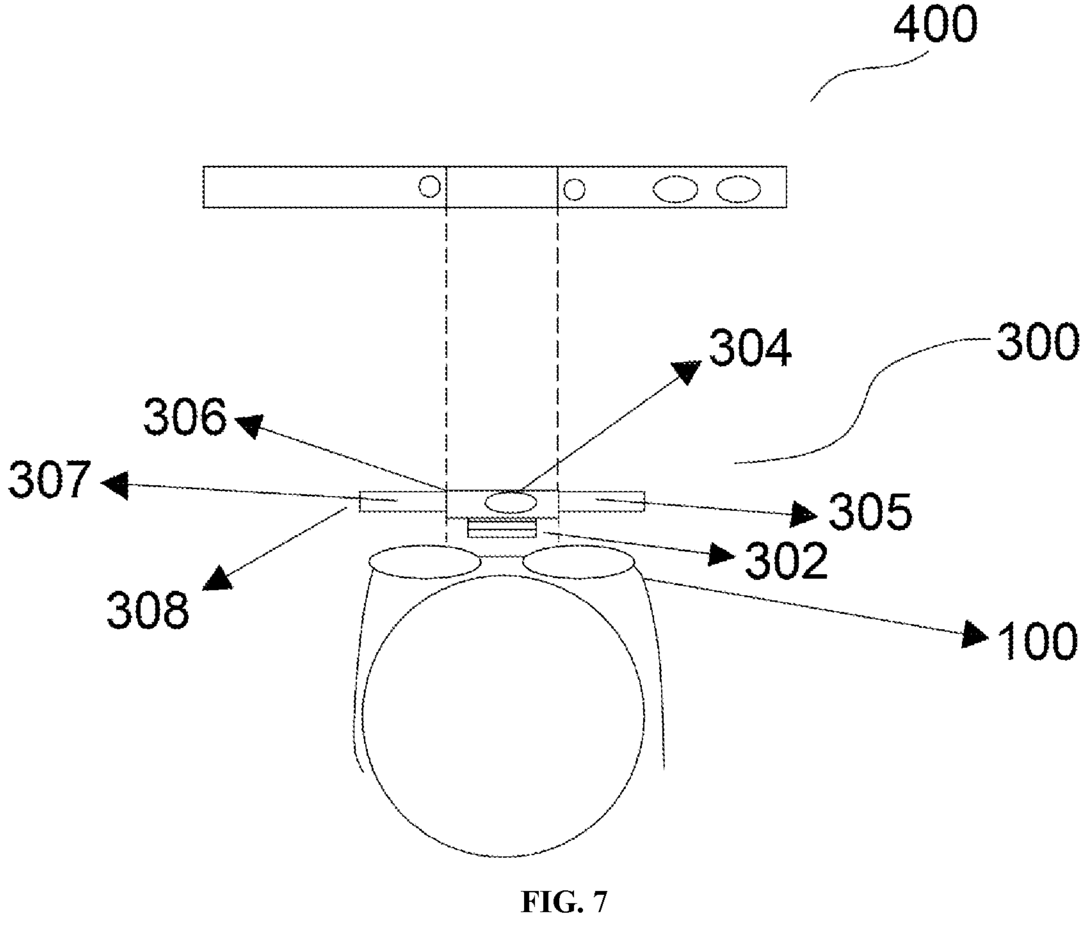
FIG. 7 illustrates a top view of the embodiment in FIG. 6.

Referring to FIG. 6, an example diagram of application of the training glasses, the training device, and a training system thereof of the present disclosure is shown.

The trainee sits at a desk and wears the first training lens 100 used for near distance. The training device 300 and a display unit 400 are placed in sequence on the desk facing the trainee. A distance between the training device 300 and the display unit 400 is not less than 45 cm, and the training device 300 is arranged between the trainee and the display unit 400.

Before training, the pupil distance of the trainee is first measured. The front plate unit 3061 and the rear plate unit 3062 of the screen isolation area 306 are slid to adjust relative positions thereof, so that the width of the screen isolation area 306 is equal to the pupil distance.

The chin and head of the trainee is closely fixed to the adjustable chin support 303 and the adjustable head support 302 on the training device 300.

The present disclosure adopts a method of binocular training, so the training screen unit 301 is divided into three areas. As the screen isolation area 306 in the middle is opaque charcoal, so that central visual fields of the two eyes are divided into the first screen area 305 and the second screen area 307, which are relatively independent of the two eyes respectively. Through the transparent red first screen area 305, the trainee's right eye sees a red first central training visual target 4011 but not seeing the green second central training visual target 4012. Similarly, the trainee's left eye sees the green second central training visual target 4012 but not seeing the red first central training visual target 4011 through the transparent green second screen area 307.

The peripheral retina is not sensitive to color due to the lack of cone-shaped photoreceptors, so the peripheral retina training visual targets are black. When the trainee sees the black peripheral visual targets through the transparent red or green screens, these peripheral visual targets remain looking black.

In the present disclosure, two training visual targets are used to play different roles.

The central training visual targets lock the two eyes at a fixed position when divergent fusion of the targets images occurs, thus avoiding unnecessary eyes movements that can affect peripheral retina training.

The reason why using black peripheral training visual target is that red filter is in front of the right eye, and green filter is in front of the left eye. In this situation, no matter what visual target color is, usually one eye sense this color more while the fellow eye sense it less, so the color sensation between the two eyes is different. In addition, there are no color sensitive photoreceptor cells in the peripheral retina, which mainly senses contrast between black and white and contrast in brightness. Therefore, using colored peripheral training visual targets makes little sense or is even meaningless. Therefore, the applicant picks black color for the peripheral training visual target (such as Black Horse). Regardless of being filtered with the red, the green, or another color screen, the visual target still appears black, so there is no color sensation deviation nor confusion between the two eyes.

In the above embodiment, the red first screen area 305 on the right side and the green second screen area 307 on the left side can be transposed, that is, the first screen area 305 is green, and the second screen area 307 is red. However, it needs to ensure that the color of the first central training visual target is corresponding to the color of the filter for the first screen area, and the color of the second central training visual target is corresponding to the color of the filter for the second screen area.

The training visual target of the display unit 400 will be further explained below.

According to the present disclosure, during training, the display unit 400 simultaneously provides two visual targets, one target for use with each of the two eyes. A distance between the two visual targets is not less than the pupil distance of the trainee when the eyes are at the primary eye position. After processing of the visual targets images collected by the two eyes at the brain visual center, the two visual targets images are fused together to achieve a binocular single vision, which enhances inhibition of activation of the center of the near-reflex pathway, relaxation of the ciliary muscles from the contraction and spasm state, recovering the increased anterior-posterior diameter of the crystalline lens back to the normal state, strengthening the lateral rectus (abductor) and weakening the medial rectus (adductor) extraocular muscles.

Figure 8:
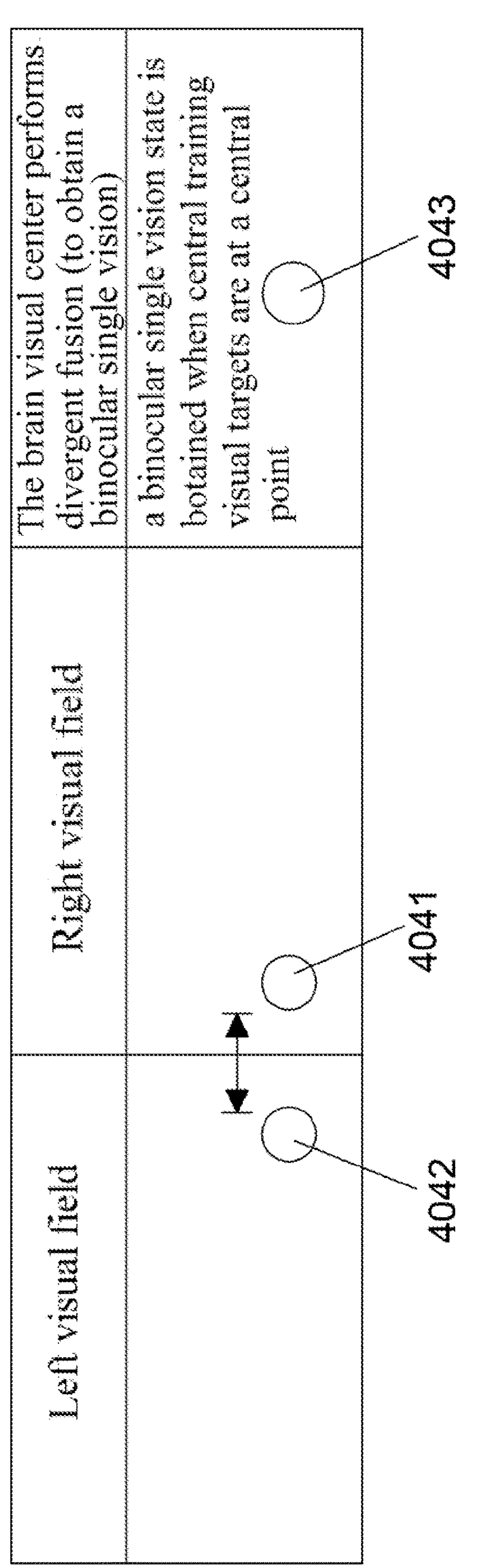
FIG. 8 illustrates a schematic diagram of a binocular single vision effect obtained by looking at the central training visual targets via the left and right eyes respectively and performing divergent fusion via the brain visual center.
Figure 9:
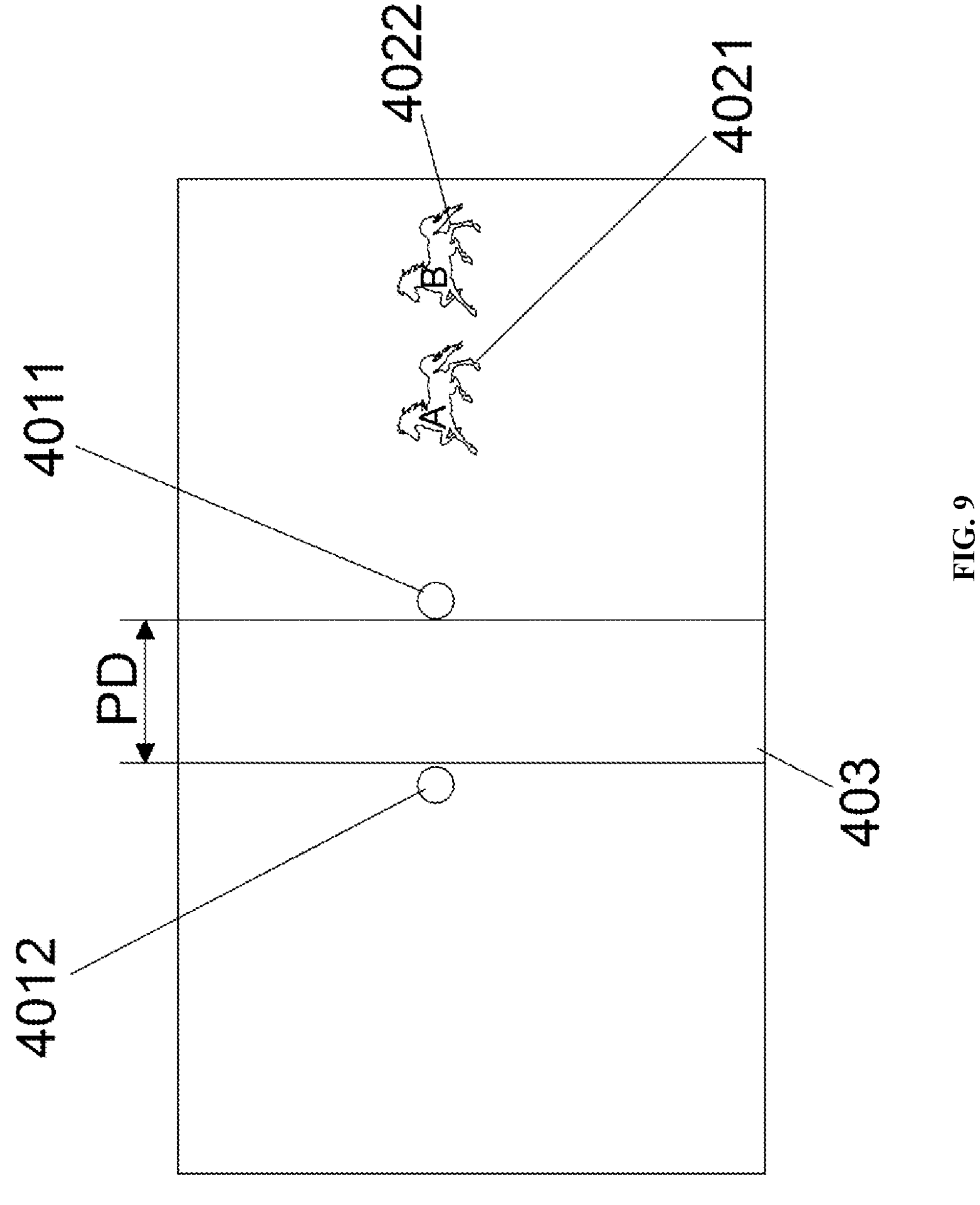
FIG. 9 illustrates a schematic diagram of positions of central training visual targets and peripheral training visual targets on a display unit.

FIG. 8 illustrates a schematic diagram of a binocular single vision obtained after divergent fusional processing of the visual targets 4041 and 4042 images collected by the two eyes at the brain visual center and forming a fusional image 4013 to maintain alignment of the two eyeballs visual axes on the targets before starting the peripheral visual target training. FIG. 9 illustrates a schematic diagram of positional relationships between the central training visual targets 4011 and 4012 and peripheral training visual targets 4021 and 4022 on the display unit 400.

A display isolation area 403 is arranged in the center of the display unit 400. A width of the display isolation area 403 is consistent with the width of the screen isolation area 306 on the training device 300. When a trainee sits at the desk for training, the display isolation area 403 of the display unit 400 is located directly behind the screen isolation area 306 of the training device 300, that is, the visual fields of the left and right eyes of the trainee are exactly separated by two side edges of each of the display isolation area 403 and the screen isolation area 306.

FIGS. 10A-10G show schematic diagrams of a training process of the central training visual targets on the display unit 400.

The first peripheral training visual target 4021 and the second peripheral training visual target 4022 each have two states: a static state and a dynamic state.

Figure 10A:
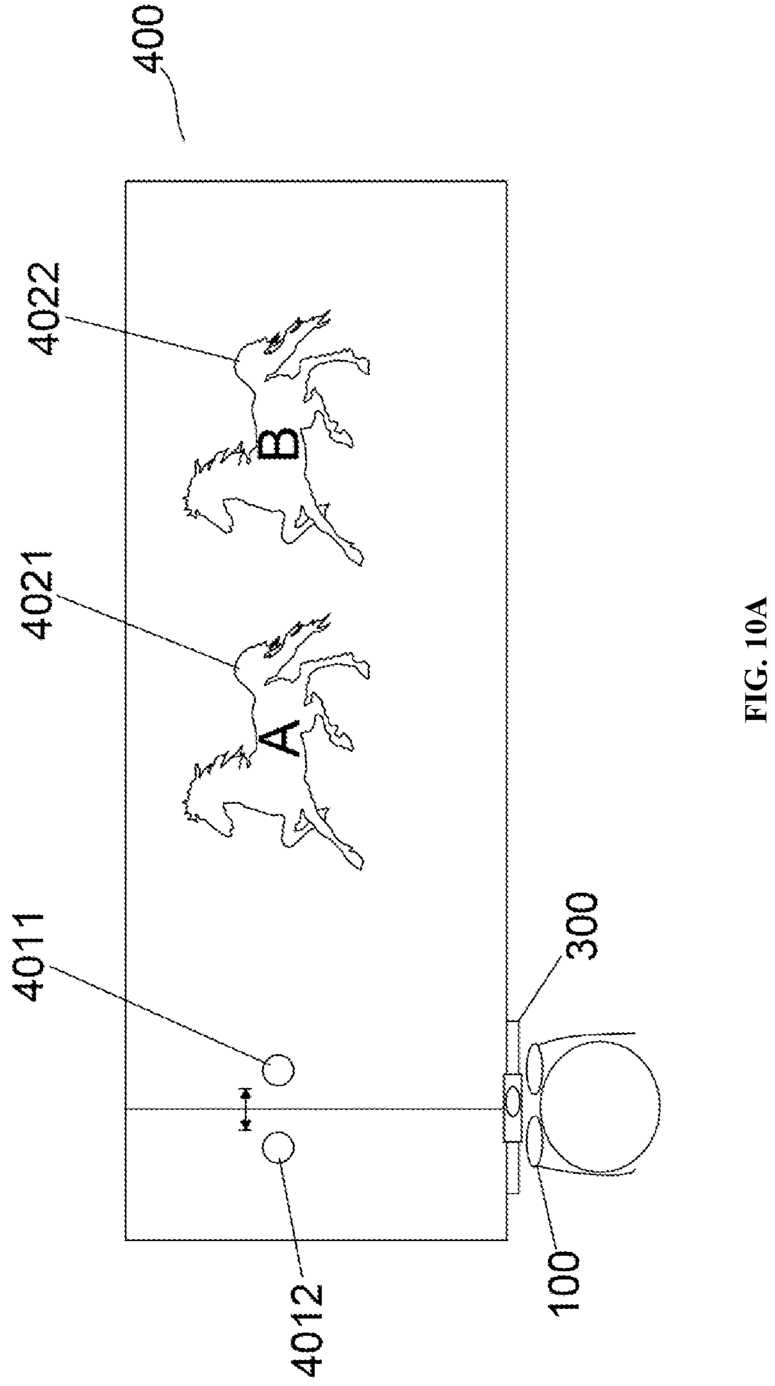
FIGS. 10A-10G show schematic diagrams of training by making use of training visual targets.

When the first and second central training visual targets 4011 and 4012 are at an initial position when the distance between the central training visual targets is 2~30 mm greater than the primary eye position's pupil distance of the trainee and reached a static binocular single vision state. This is an precondition of training by means of the first and second peripheral training visual targets 4021 and 4022. Next, an action process of the two peripheral training visual targets 4021 and 4022 is specifically described below:

FIG. 10A illustrates static modes of the first and second peripheral training visual targets 4021 and 4022, that is, the first and second peripheral training visual targets are at their initial positions and remain stationary, where 4021 is at a position of temporal 25° of the visual field.

Figure 10B:
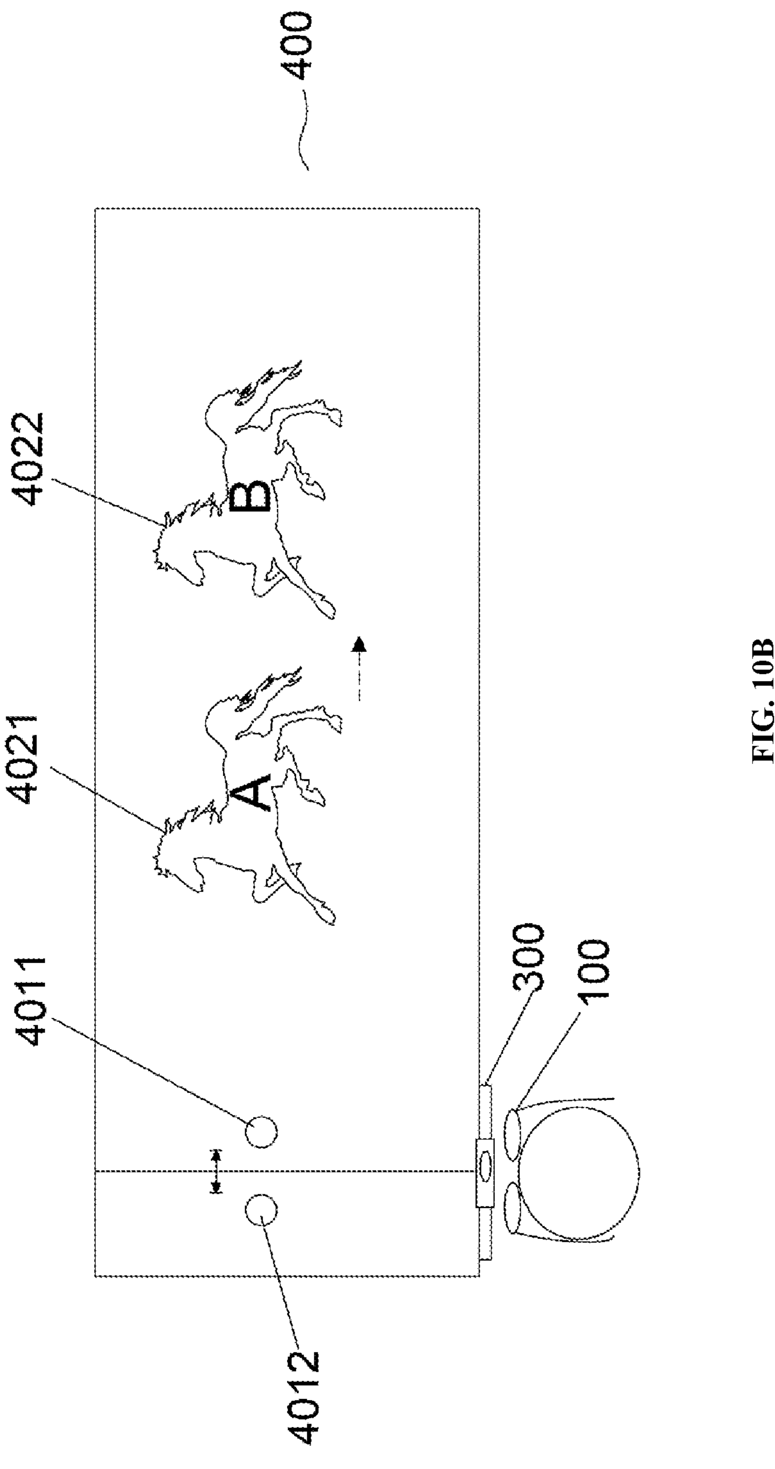

FIGS. 10B-10G show dynamic modes of the first and second peripheral training visual targets 4021 and 4022 in the arrow direction, specifically as follows:

In FIG. 10B, as indicated by the rightward arrow, the first peripheral training visual target 4021 moves towards the second peripheral training visual target 4022.

Figure 10C:
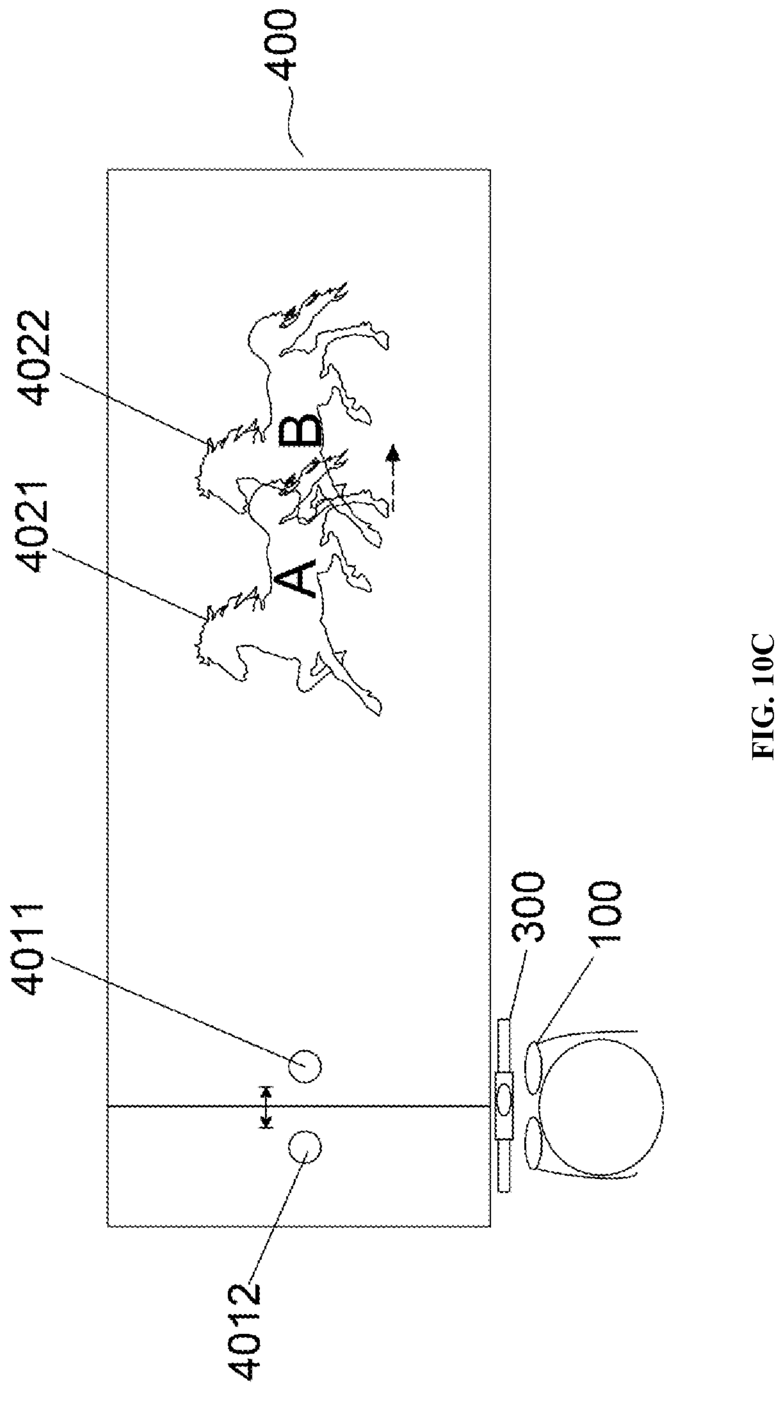

In FIG. 10C, the first peripheral training visual target 4021 gets closer to the second peripheral training visual target 4022.

Figure 10D:
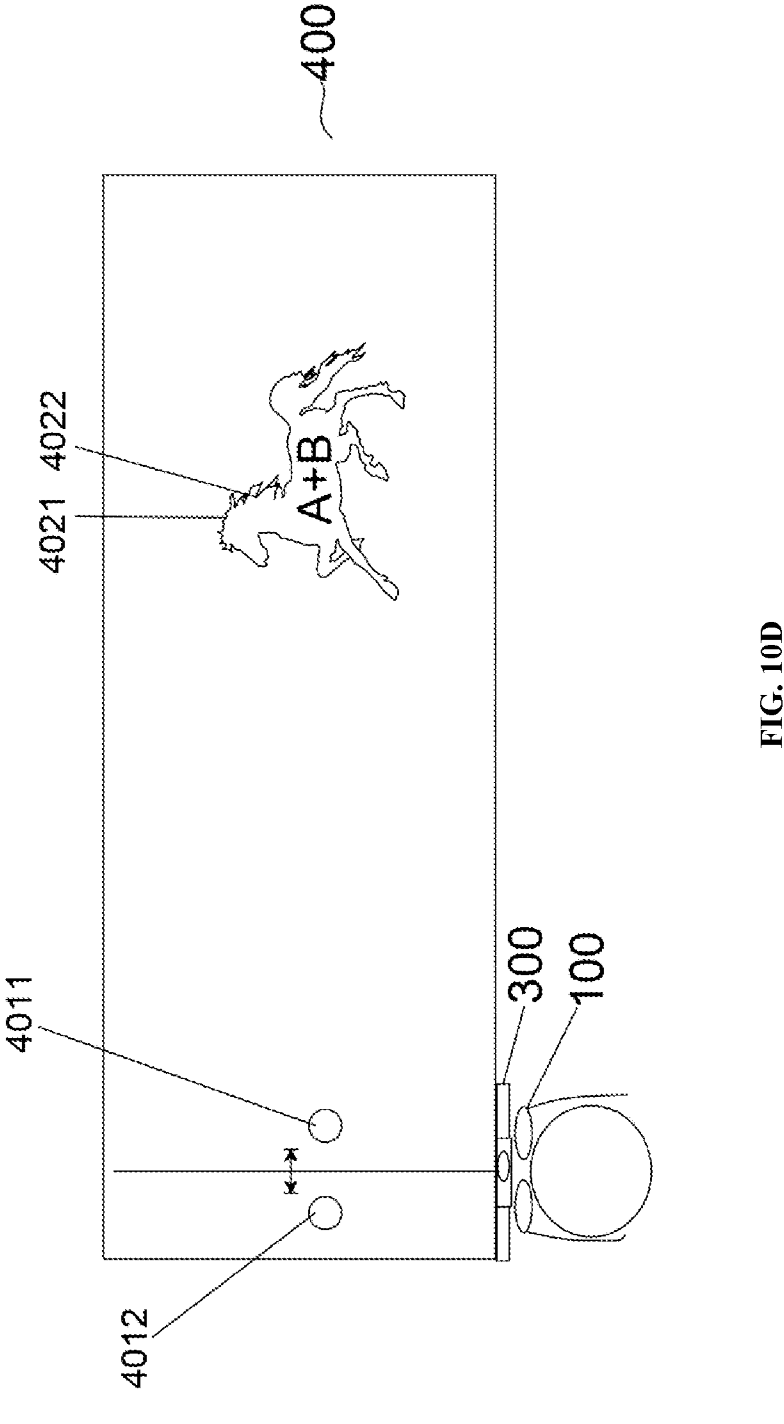

FIG. 10D is a schematic diagram showing that the first and second peripheral training visual targets 4021 and 4022 are completely overlapped.

Figure 10E:
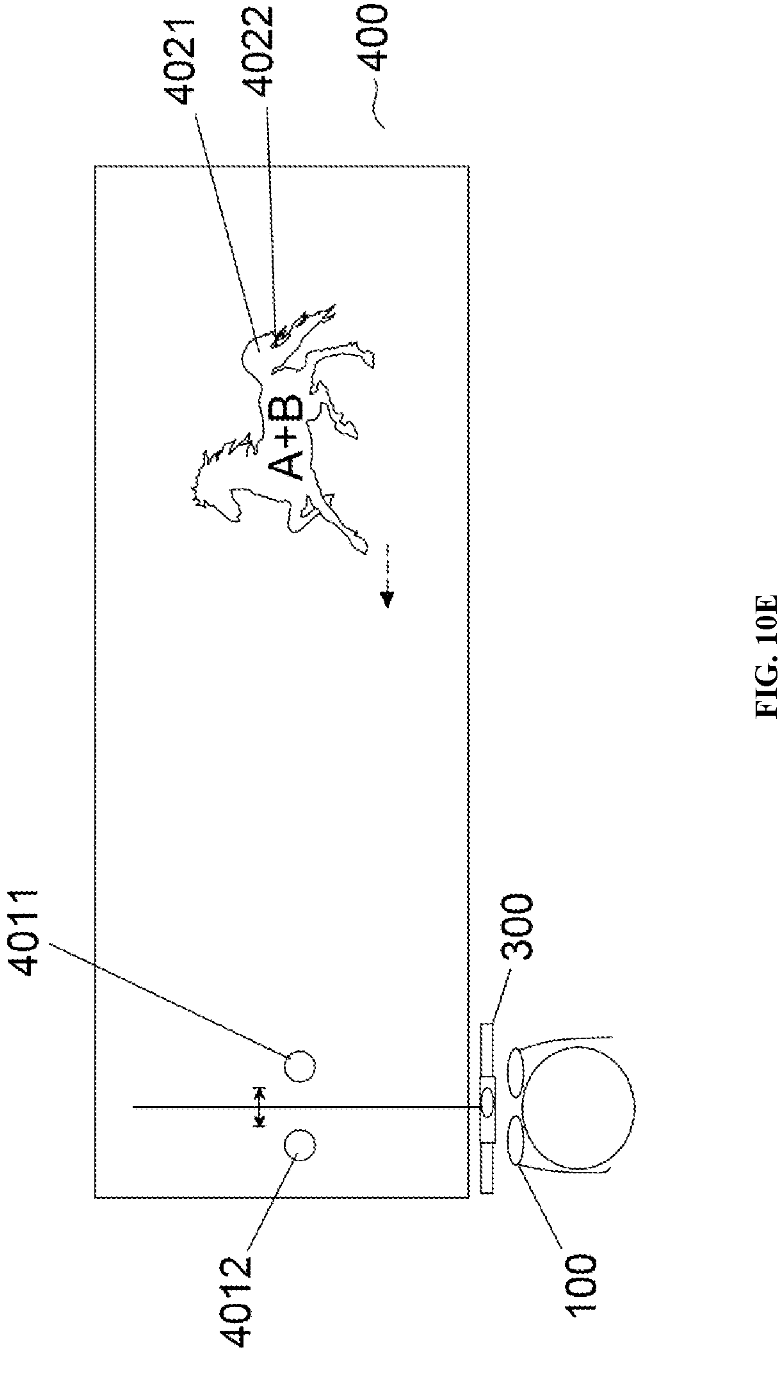
Figure 10F:
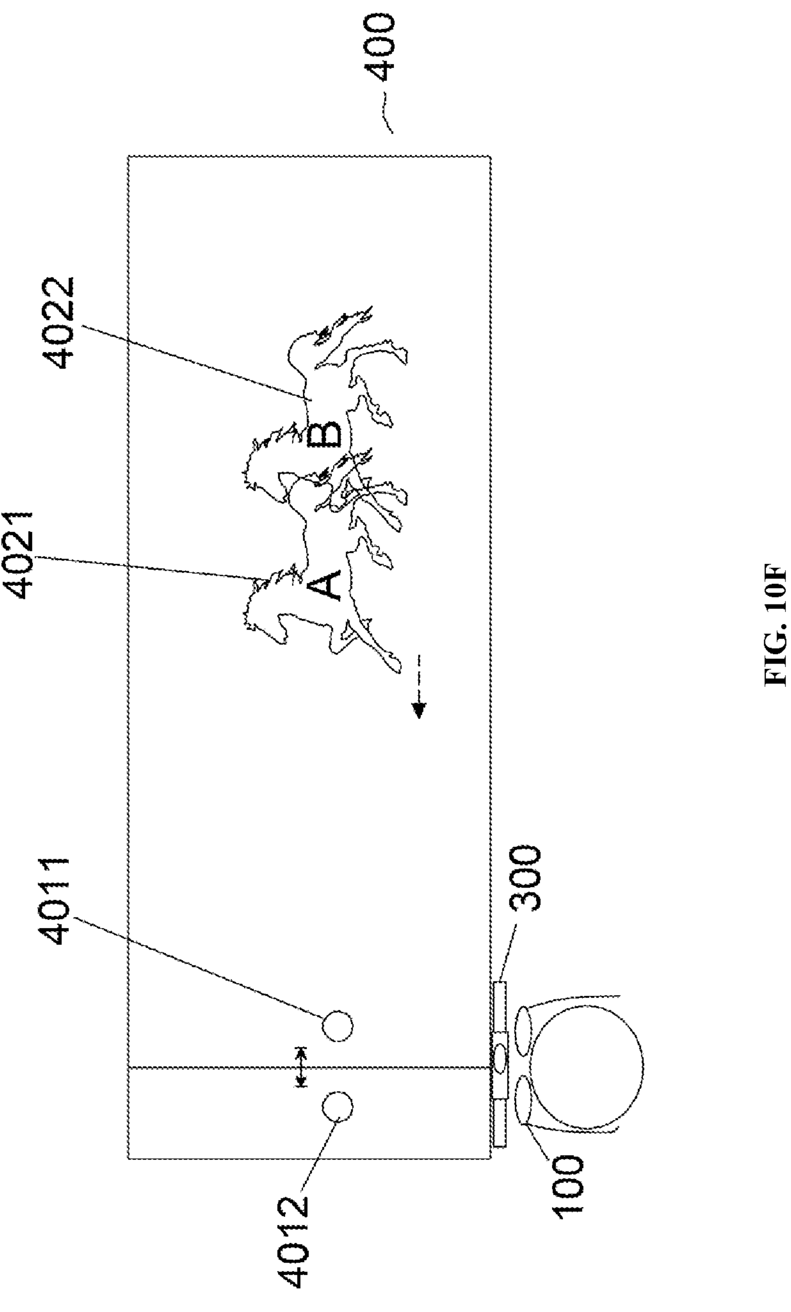
Figure 10G:
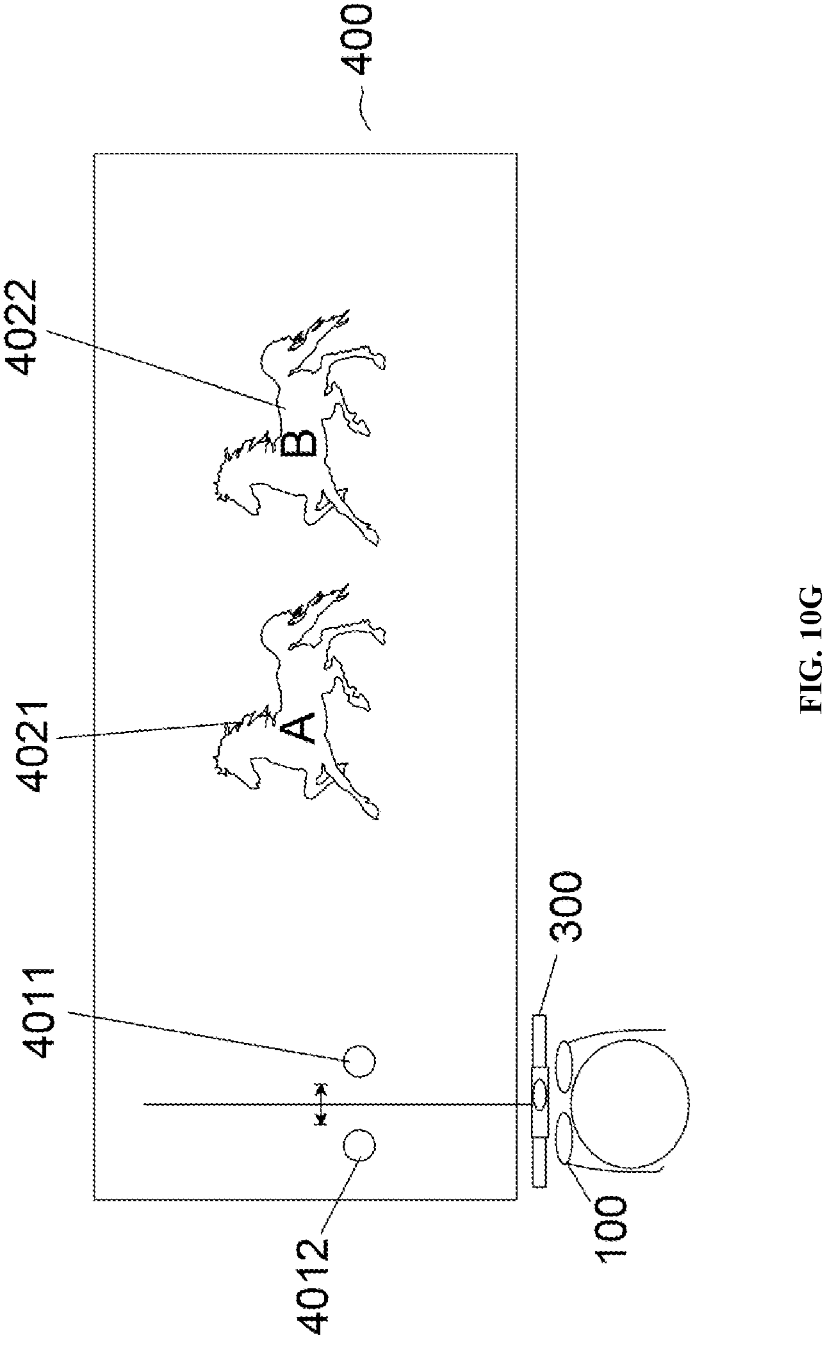

Then, as indicated by the arrow, the first peripheral training visual target 4021 moves in an opposite direction to get away from the second peripheral training visual target 4022 and returns to the initial position, as shown in FIGS. 10E-10G.

The above training steps are repeated at least twice.

In the above embodiment, an example pattern used for the peripheral training visual targets is a cartoon pattern of a galloping horse, and other patterns can also be used.

Lengths of the first and second central training visual targets 4011 and 4012 are 5 mm to 60 mm, with a length-width ratio or a width-length ratio of 1:5.

Movement speed of the central training visual targets 4011 and 4012 ranges from 0.1°/second to 3°/second.

The first and second central training visual targets 4011 and 4012 include any one of three-dimensional (3D) visual targets, pattern visual targets, text visual targets, pattern and text combined visual targets, and pattern-color combined visual targets.

The background of the first and second central training visual targets 4011 and 4012 is gray, and there are usually two central training visual targets, which are displayed on the screens corresponding to the visual fields of the left eye and the right eye, respectively. The colors of the visual targets corresponding to the left and right eyes are different, and are consistent with the colors of the transparent first and second screens respectively. For example, the trainee sees the red central training visual target with the right eye through the transparent red screen, and sees the green central training visual target with the left eye through the transparent green screen. Alternatively, sees the blue central training visual target with the right eye through the transparent blue screen, and sees the yellow central training visual target with the left eye through the transparent yellow screen.

The peripheral training visual targets used in the training method of the present disclosure need to satisfy the following conditions:

(1) The background color of the peripheral training visual target is light gray.

(2) The peripheral training visual target is a matte black pattern, such as a cartoon horse.

(3) The peripheral training visual target position ranges from 25° to 60° of the temporal visual field.

(4) The size of the peripheral training visual target is 16 times that of the central training visual target.

(5) The static and dynamic movement modes of the peripheral training visual targets are as follows: when the distance between the central training visual targets is 2~30 mm greater than the primary eye position's pupil distance of the trainee, and reached a static binocular single vision state.

(6) Each of the peripheral training visual targets can also appear separately in the left or right temporal visual field for training. The peripheral training visual target in any one of the left and right temporal visual field can be used for unilateral training.

The present disclosure can be implemented through a complete set of application software. The application can be installed on a computer, a mobile phone, or a tablet. The trainee can freely select a desired training content by operating directly on these interaction terminals. The trainee is trained by watching the training visual targets on a computer screen, a television screen or a projection screen etc. In the training process, the visual targets, the background music, and the like can be changed based on the actual requirements.

The application program has two versions: online APP and offline APP.

For the online APP, main core data is stored in a cloud server, and only a small amount of data is downloaded to an interaction device terminal (such as an iPad) for a user to select the device being used for installation, and the data is processed through communication with a backend server.

For the offline APP, all data is directly downloaded to an interaction terminal device and the device is ready for use.

It is required that a training place is quiet, adequately lit with flat desktop and comfortable chair.

During the training through the application program, a general process is as follows:

step I: a training software program is opened;

step II: a login interface is entered to set basic information, such as name, age, current visual acuity levels of the trainee;

step III: a menu option is entered;

step IV: a "Training content" module is selected;

step V: a "Training time" module is selected;

step VI: the trainee sits in front of the screen, with the sight perpendicular to the screen;

step VII: an "Visual target position adjustment and correction" module in the menu is selected to deal with left-right and up-down deviations and latent squint, and the like of the trainee, so that the most natural and accurate starting points are reached and thus avoiding the undesirable interference caused by horizontal and/or vertical deviations between the two eyes.

step VIII: the training visual targets are displayed on the screen, wherein the training visual target of each single eye only appears on the temporal region of the visual field thereof to stimulate the visual center to improve the visual acuity, eliminate pseudomyopia, and slow or inhibit the occurrence and progress of true myopia; the visual targets in the left and right visual fields move the same distance and at the same speed;

step IX: the training begins;

step X: any section of the training can be paused, continued, reselected, or back in the training process;

step XI: after the training, the system stores and records the current training related data, and at the same time, results of visual acuity measurement of the trainee are recorded as well if available.

step XII: back to the homepage.

In order to explain the technical solution of the embodiment of the present disclosure more clearly, the drawings needed in the description of the embodiment will be briefly introduced hereinafter. Obviously, the accompanying drawings in the following description are only some examples or embodiments of the present disclosure. For those of ordinary skill in the art, the present disclosure can be applied to other similar situations according to these drawings without creative labor. Unless it is obvious from the linguistic context or otherwise stated, the same reference numerals in the drawings represent the same structure or operation.

As shown in the present disclosure and claims, unless exceptions are clearly indicated in the context, the words "a", "an", "a type of" and/or "the" do not refer to the singular, but may also refer to the plural. Generally speaking, the terms "including" and "comprising" only imply the inclusion of clearly identified steps and elements, and these steps and elements do not constitute an exclusive list. A method or device may also contain other steps or elements.

Unless otherwise specified, the relative arrangement of parts and steps, numerical expressions and numerical values set forth in these embodiments do not limit the scope of the present disclosure. At the same time, it should be understood that for the convenience of description, the dimensions of various parts shown in the drawings are not drawn according to the actual scale relationship. Techniques, methods and devices known to those of ordinary skill in the art may not be discussed in detail, but in appropriate cases, the techniques, methods and devices should be regarded as part of the authorization specification. In all examples shown and discussed herein, any specific values should be interpreted as illustrative only and not as a limitation. Therefore, other examples of exemplary embodiments may have different values. It should be noted that similar numbers and letters indicate similar items in the following drawings. Therefore, once an item is defined in one drawing, it does not need to be further discussed in subsequent drawings.

In the description of the present disclosure, it should be understood that the orientational or positional relationships indicated by the orientation words such as "front, back, upper, lower, left, right", "lateral, vertical, perpendicular, horizontal" and "top, bottom" are usually based on the orientation or positional relationship shown in the accompanying drawings only for the convenience of describing the present disclosure and simplifying the description. Unless otherwise stated, these orientation words do not indicate or imply that the referred devices or elements must have a specific orientation, be constructed and operated in a specific orientation, and therefore should not be construed as limiting the scope of the present disclosure. The orientation words such as "inside, outside" refer to the inside and outside with respect to the outline of each component itself.

For the convenience of description, spatially relative terms such as "on", "over", "on the upper surface of" and "above" can be used here to describe the spatial positional relationship between a device or feature and other devices or features as shown in the drawings. It should be understood that spatially relative terms are intended to encompass different orientations in use or operation in addition to the orientation of the device depicted in the drawings. For example, if the devices in the drawings are inverted, devices described as "over other devices or structures" or "on other devices or structures" will be positioned as "under other devices or structures" or "below other devices or structures". Thus, the exemplary term "over" can include both directions of "over" and "below". The device can also be positioned in other different positions (rotated by 90 degrees or in other orientations), and the spatial relative description used here is explained accordingly.

In addition, it should be noted that the words "first" and "second" are used to define parts only for the convenience of distinguishing the corresponding parts. Unless otherwise stated, the above words have no special meaning, so that they cannot be understood as limiting the scope of the present disclosure. In addition, although the terms used in the present disclosure are selected from well-known and common terms, some terms mentioned in the specification of the present disclosure may be selected by the applicant according to the applicant's judgment, and their detailed meanings are explained in the relevant parts of the description herein. In addition, it is required to understand the present disclosure not only by the actual terms used, but also by the meaning contained in each term.

The basic concepts have been described above. Obviously, for those skilled in the art, the above disclosure is only an example, and does not constitute the limitation of the present disclosure. Although not explicitly described here, those skilled in the art may make various modifications, improvements and amendments to the present disclosure. Such modifications, improvements and amendments are suggested in the present disclosure, so that the modifications, improvements and amendments still belong to the spirit and scope of the exemplary embodiment of the present disclosure.

Meanwhile, the present disclosure uses specific words to describe the embodiments of the present disclosure. For example, "one embodiment", "an embodiment" and/or "some embodiments" mean a certain feature, structure or characteristic related to at least one embodiment of the present disclosure. Therefore, it should be emphasized and noted that references to "an embodiment" or "one embodiment" or "an alternative embodiment" for two or more times in different places in this specification do not necessarily refer to the same embodiment. In addition, some features, structures or characteristics in one or more embodiments of the present disclosure can be appropriately combined.

In the same way, it should be noted that in order to simplify the expression disclosed in the present disclosure and help to understand one or more embodiments of the present disclosure, in the previous description of the embodiments of the present disclosure, various features are sometimes combined into one embodiment, drawings or descriptions thereof. However, the disclosure method does not mean that the object of the present disclosure needs more features than those mentioned in the claims. In fact, the features of the embodiment are less than all the features of a single embodiment disclosed above.

In some embodiments, numbers describing the number of ingredients and attributes are used. It should be understood that such numbers used in the description of embodiments are modified by the modifiers "about", "approximately" or "substantially" in some examples. Unless otherwise specified, "about", "approximately" or "substantially" means that the number allows a variation of plus or minus 20%. Accordingly, in some embodiments, the numerical parameters used in the specification and claims are approximate values, which can be changed according to the required characteristics of individual embodiments. In some embodiments, the numerical parameters should take the specified significant digits into account and adopt the method of general digit reservation. Although the numerical fields and parameters used to confirm the range and breadth in some embodiments of the present disclosure are approximate values, in specific embodiments, such numerical values are set as accurately as possible within the feasible range.

Although the present disclosure has been described with reference to the current specific embodiments, those skilled in the art should realize that the above embodiments are only used to illustrate the present disclosure, and various equivalent changes or substitutions can be made without departing from the spirit of the present disclosure. Therefore, as long as the changes and modifications of the above embodiments are within the true spirit scope of the present disclosure, they will fall within the scope of the claims of the present disclosure.

What is claimed is:

1. Training glasses comprising two lenses, wherein each of the lenses comprises a first refractive training area and a second refractive training area; the first refractive training area is formed as an enclosed area at a center of said each of the lenses, and the second refractive training area is formed as an area other than the first refractive training area of said each of the lenses, wherein the second refractive training area has a diopter ranging from +1.0 D to +4.5 D, wherein each of the lenses further comprises:

a transition area located between the first refractive training area and the second refractive training area; a width of the transition area is 0 to 10 mm, and the transition area has a diopter between a diopter of the first refractive training area and the diopter of the second refractive training area, and a third refractive training area, composed of a part of the second refractive training area above the first refractive training area, and the diopter of the first refractive training area is equal to a diopter of the third refractive training area.

2. The training glasses according to claim 1, wherein the enclosed area is in a shape of any one of circle, ellipse, square, rectangle, and polygon.

3. The training glasses according to claim 2, wherein the second refractive training area is composed of a colored lens with darkness less than 50%.

4. The training glasses according to claim 1, wherein the first refractive training area comprises a convex lens with a central diopter of +1.50 D to +4.50 D.

5. The training glasses according to claim 4, wherein the second refractive training area is composed of a colored lens with darkness less than 50%.

6. The training glasses according to claim 1, wherein the first refractive training area comprises a plain glass area or a hollow area with zero diopter.

7. The training glasses according to claim 6, wherein the second refractive training area is composed of a colored lens with darkness less than 50%.

8. The training glasses according to claim 1, wherein the second refractive training area is composed of a colored lens with darkness less than 50%.

9. A training system comprising:

training glasses comprising two lenses, wherein each of the lenses comprises a first refractive training area and a second refractive training area; the first refractive training area is formed as an enclosed area at a center of said each of the lenses, and the second refractive training area is formed as an area other than the first refractive training area of said each of the lenses, wherein the second refractive training area has a diopter ranging from +1.0 D to +4.5 D;

a display unit; and a training device, comprising:

a training screen unit, comprising a screen isolation area vertically dividing the training screen unit into a first screen area and a second screen area;

a bracket and a base supporting the bracket; and a distance adjustment unit configured to adjust a width of the screen isolation area, wherein the screen isolation area is opaque charcoal, and the first screen area and the second screen area are transparent screens with different colors, wherein a distance between the training device and the display unit is not less than 45 cm.

10. The training system according to claim 9, wherein the bracket further comprises an adjustable head support and an adjustable chin support.

11. A training method implemented by using the training system according to claim 10, wherein the training method comprises:

step I, obtaining a pupil distance of a trainee at a primary eye position, and adjusting a width of each of the screen isolation area and a display isolation area to be equal to the pupil distance;

step II, enabling a chin and a head of the trainee lean closely against an adjustable chin support and an adjustable head support of the training device respectively;

step III, arranging a first central training visual target and a second central training visual target on two sides outside the display isolation area respectively;

step IV, providing at least two peripheral training visual targets on an area of the display unit where one of the first and second central training visual target is located;

step V, moving one of the peripheral training visual targets from a temporal 25° of the trainee to another of the peripheral training visual targets until the two peripheral training visual targets are overlapped, and then returning the one of the peripheral training visual targets to a starting position thereof; and step VI, repeating step V at least twice, wherein the color of the first screen area is same as a color of the first central training visual target while the color of the second screen area is same as a color of the second central training visual target on the display unit.

12. The training method according to claim 11, wherein in step III, an initial distance between the first central training visual target and the second central training visual target is 2-30 mm greater than a pupil distance of the trainee at the primary eye position.

13. The training method according to claim 11, wherein each of the first central training visual target and the second central training visual target has a length ranging from 5 mm to 60 mm, and a length-width ratio or a width-length ratio of 1:5.

14. The training method according to claim 11, wherein each of the first central training visual target and the second central training visual target has a movement speed ranging from 0.1°/second to 3°/second.

15. The training method according to claim 11, wherein each of the first central training visual target and the second central training visual target comprises any one of a three-dimensional (3D) visual target, a pattern visual target, a text visual target, a pattern and text combined visual target, and a pattern and color combined visual target.

16. The training method according to claim 11, wherein a background color of each of the peripheral training visual targets is gray, and each of the peripheral training visual targets is a matte black pattern.

17. The training system according to claim 9, wherein the screen isolation area comprises a front plate unit and a rear plate unit which are stacked with each other; scales are arranged at an upper edge of each of the front plate unit and the rear plate unit; the rear plate unit adjusts the width of the screen isolation area by means of slide of the distance adjustment unit in a horizontal direction.

* * * * *